US008926305B2

(12) United States Patent
Kuchar et al.

(10) Patent No.: US 8,926,305 B2
(45) **Date of Patent: *Jan. 6, 2015**

(54) GENERAL PURPOSE DISPENSER TO DEPLOY AND EXPAND WEB MATERIAL

(75) Inventors: Matthew J. Kuchar, Metuchen, NJ (US); David M. Kuchar, Metuchen, NJ (US)

(73) Assignee: KUCHARCO Corporation, Metuchen, NJ (US)

( * ) Notice: Subject to any disclaimer, the term of this patent is extended or adjusted under 35 U.S.C. 154(b) by 718 days.

This patent is subject to a terminal disclaimer.

(21) Appl. No.: 13/223,316

(22) Filed: Sep. 1, 2011

(65) Prior Publication Data

US 2011/0309125 A1 Dec. 22, 2011

Related U.S. Application Data

(63) Continuation-in-part of application No. 13/112,106, filed on May 20, 2011, which is a continuation-in-part of application No. 12/943,822, filed on Nov. 10, 2010.

(60) Provisional application No. 61/260,807, filed on Nov. 12, 2009.

(51) Int. Cl.

| | |
|---|---|
| ***B29C 55/16*** | (2006.01) |
| ***B65H 75/18*** | (2006.01) |
| ***B31D 3/00*** | (2006.01) |

(52) U.S. Cl.

CPC .................................... *B31D 3/002* (2013.01)
USPC .................... 425/214; 242/580.1; 242/597.8; 264/288.8; 264/290.2; 425/363; 425/383

(58) Field of Classification Search

USPC ............ 425/214, 363, 383; 264/288.4, 288.8, 264/290.2; 242/579, 580, 580.1, 585, 597, 242/597.8

See application file for complete search history.

(56) References Cited

U.S. PATENT DOCUMENTS

| | | | | |
|---|---|---|---|---|
| 347,324 | A | 8/1886 | Cramer | 229/120.4 |
| 1,895,642 | A | 1/1933 | Preble | 55/487 |
| 2,037,164 | A | 4/1936 | Harrah | 55/489 |
| 2,319,225 | A | 5/1943 | Grebe et al. | 52/670 |
| 2,493,726 | A | 1/1950 | O'Day | 55/443 |
| 2,558,185 | A | 6/1951 | Leisen | 55/520 |
| 2,602,521 | A | 7/1952 | Smith | 55/487 |
| 2,989,145 | A | 6/1961 | Goodloe | 55/443 |
| 3,040,968 | A | 6/1962 | Long et al. | 229/87.08 |
| 3,067,039 | A | 12/1962 | Crane | 426/106 |
| 3,069,067 | A | 12/1962 | Crane | 229/87.08 |
| 3,080,579 | A | 3/1963 | Gordon | 267/103 |

(Continued)

*Primary Examiner* — James Mackey

(74) *Attorney, Agent, or Firm* — Ernest D. Buff & Associates, LLC; Ernest D. Buff, Esq.; Harry Anagnost, Esq.

(57) ABSTRACT

A dispensing mechanism that deploys a roll of web material having slit cuts and expands it into a web with a cellular structure. This is accomplished by mounting the roll of unexpanded web material on an axle that is positioned at a first angle to a guide wheel assembly. That first angle is not perpendicular to the direction of deployment. The material moves through the guide wheel assembly longitudinally in such a way that tension is applied at a second angle to the direction of deployment. This diagonal tension causes the web material to expand and form cells. Single axle as well as multi-axle systems are disclosed. In this way, a plurality of rolls of web material may be deployed and expanded as a single unit.

20 Claims, 28 Drawing Sheets

(56) References Cited

U.S. PATENT DOCUMENTS

| | | | | | |
|---|---|---|---|---|---|
| 3,109,579 | A | | 11/1963 | Crane | 229/87.08 |
| 3,245,606 | A | | 4/1966 | Crane | 383/103 |
| 3,346,246 | A | | 10/1967 | Loetel et al. | 261/103 |
| 3,407,550 | A | | 10/1968 | Shaw | 52/101 |
| 3,550,842 | A | | 12/1970 | Scholz | 229/87.08 |
| 3,603,369 | A | | 9/1971 | Scholz | 229/87.08 |
| 3,655,501 | A | | 4/1972 | Tesch | 428/136 |
| 3,744,222 | A | | 7/1973 | Delao | 55/446 |
| 3,762,629 | A | | 10/1973 | Bruno | 229/87.08 |
| 3,825,465 | A | | 7/1974 | Stock | 428/135 |
| 3,839,525 | A | | 10/1974 | Doll | 264/154 |
| 3,958,751 | A | | 5/1976 | Bruno | 229/87.08 |
| 3,966,044 | A | | 6/1976 | Cunningham | 206/427 |
| 4,136,771 | A | | 1/1979 | Owen | 206/150 |
| 4,170,691 | A | | 10/1979 | Rogers | 428/572 |
| 4,306,675 | A | | 12/1981 | Swanson | 229/120.07 |
| 4,501,707 | A | | 2/1985 | Buhlmann | 261/94 |
| 4,997,721 | A | | 3/1991 | Shaw et al. | 428/557 |
| 5,244,715 | A | | 9/1993 | Kuchar | 428/195.1 |
| 5,252,111 | A | | 10/1993 | Spencer | 55/489 |
| 5,500,271 | A | | 3/1996 | Pasch et al. | 428/135 |
| 5,575,435 | A | * | 11/1996 | Sperry et al. | 242/421.4 |
| 5,691,032 | A | | 11/1997 | Trueblood et al. | 428/136 |
| 5,714,107 | A | * | 2/1998 | Levy et al. | 264/288.8 |

* cited by examiner

*PRIOR ART*

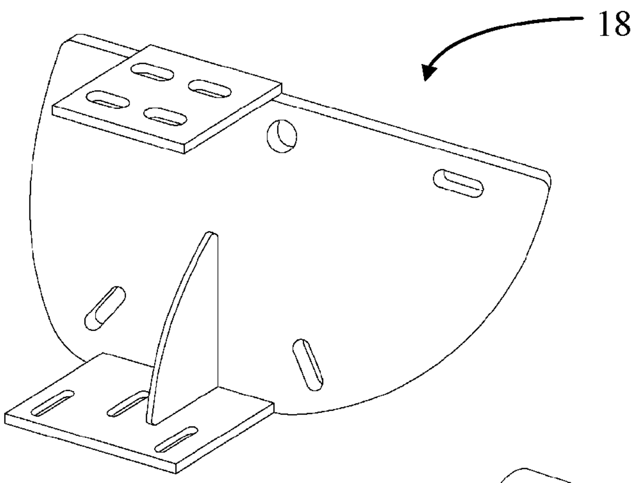
FIG. 19
FIG. 20
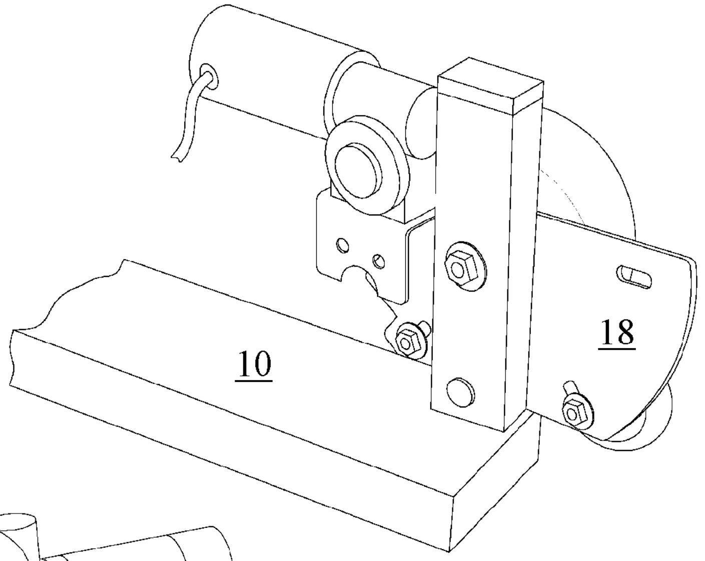
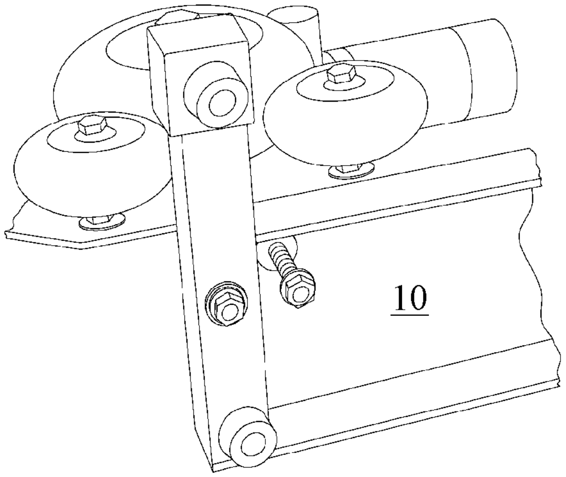
FIG. 21

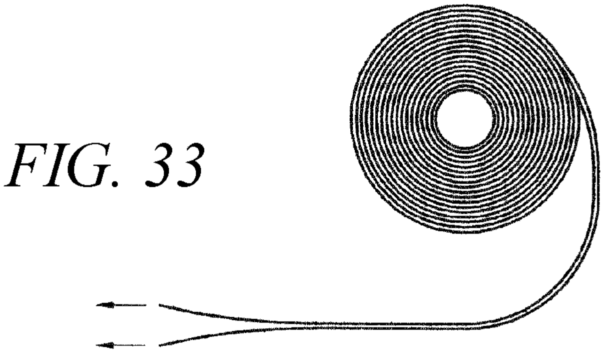
FIG. 33
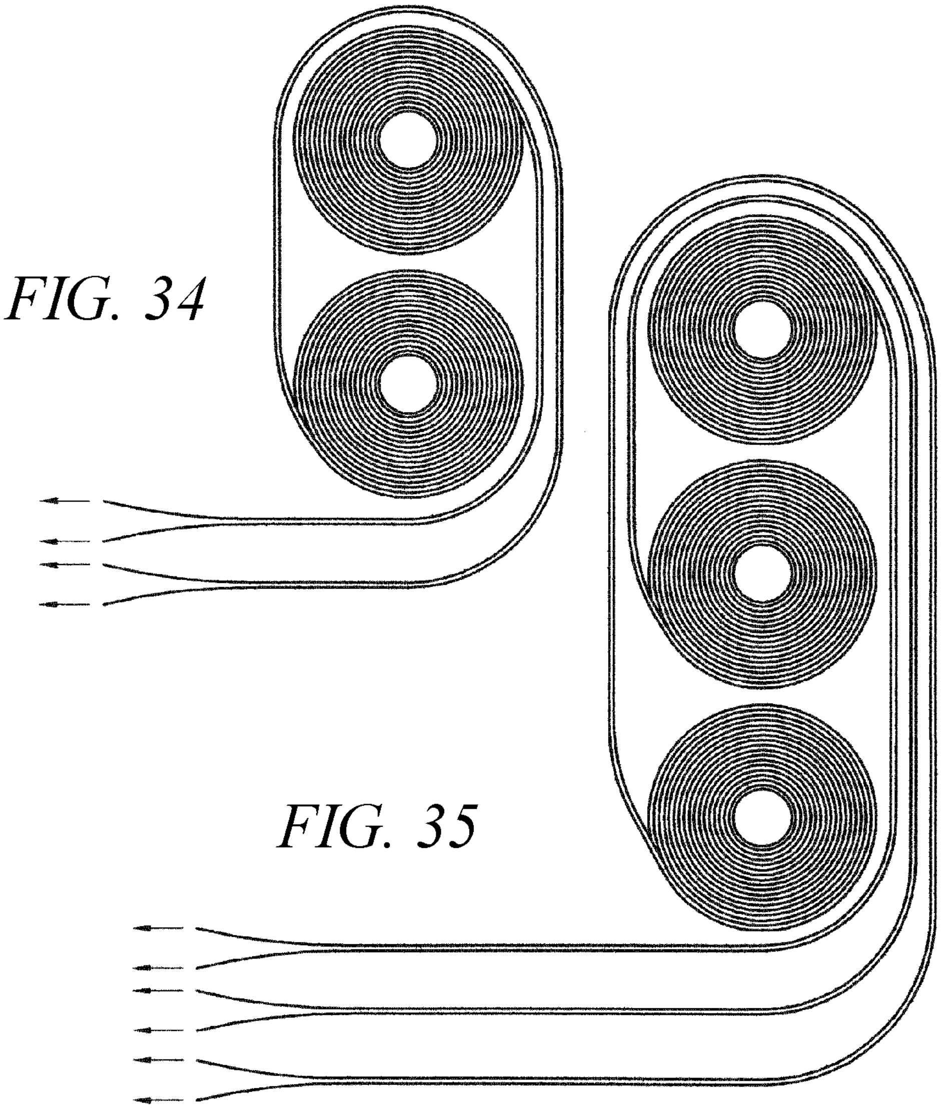
FIG. 34
FIG. 35

GENERAL PURPOSE DISPENSER TO DEPLOY AND EXPAND WEB MATERIAL

CROSS REFERENCE TO RELATED APPLICATIONS

This Present application is a continuation-in-part (CIP) of my currently pending U.S. patent application Ser. No. 13/112,106 filed on May 20, 2011 entitled "IMPROVED APPARATUS TO DEPLOY AND EXPAND WEB MATERIAL" (hereinafter, the '106 Application), which is in turn a continuation-in-part (CIP) of U.S. patent application Ser. No. 12/943,822 filed on Nov. 10, 2010 entitled "APPARATUS TO DEPLOY AND EXPAND WEB MATERIAL" (hereinafter the '822 Application), which is in turn the non-provisional counterpart of U.S. Provisional Patent Application 61/260,807 filed on Nov. 12, 2009 (hereinafter the Priority Provisional Application). The Present Application claims the benefit of and priority to said Priority Provisional Application, the '822 Application, and the '106 Application, which are all incorporated herein by reference in their entirety. The Present Application is also related to my U.S. Pat. No. 6,929,843, issued on Aug. 16, 2005, entitled "Fence Tape," which is also incorporated herein by reference in its entirety. Said US patent is hereinafter referred to as the "Fence Tape patent." The Present Application is further related to my currently pending U.S. patent application Ser. No. 12/755,316 filed on Apr. 6, 2010 entitled "EXPANDABLE WEB MATERIAL" (hereinafter, the Expandable Web Application), which is also incorporated herein by reference in its entirety. The Expandable Web Application was published on Aug. 5, 2010 as Pub. No. US 2010/0196633 A1.

CROSS REFERENCE TO RELATED APPLICATIONS

This Present application is a continuation-in-part (CIP) of my currently pending U.S. patent application 13/112,106 filed on May 20, 2011 entitled "IMPROVED APPARATUS TO DEPLOY AND EXPAND WEB MATERIAL" (hereinafter, the '106 Application), which is in turn a continuation-in-part (CIP) of U.S. patent application Ser. No. 12/943,822 filed on Nov. 10, 2010 entitled "APPARATUS TO DEPLOY AND EXPAND WEB MATERIAL" (hereinafter the '822 Application), which is in turn the non-provisional counterpart of U.S. Provisional Patent Application 61/260,807 filed on Nov. 12, 2009 (hereinafter the Priority Provisional Application). The Present Application claims the benefit of and priority to said Priority Provisional Application, the '822 Application, and the '106 Application, which are all incorporated herein by reference in their entirety. The Present Application is also related to my U.S. Pat. No. 6,929,843, issued on Aug. 16, 2005, entitled "Fence Tape," which is also incorporated herein by reference in its entirety. Said US patent is hereinafter referred to as the "Fence Tape patent." The Present Application is further related to my currently pending U.S. patent application Ser. No. 12/755,316 filed on Apr. 6, 2010 entitled "EXPANDABLE WEB MATERIAL" (hereinafter, the Expandable Web Application), which is also incorporated herein by reference in its entirety. The Expandable Web Application was published on Aug. 5, 2010 as Pub. No. US 2010/0196633 A1.

BACKGROUND OF THE INVENTION

The Fence Tape patent disclosed an expandable web material having generally parallel edges, and having substantially greater length than width. The web material can be rolled longitudinally. The web material is cut longitudinally to form slits at intervals, where the slits define linear members. The linear members comprise at least a top strand, a bottom strand, and a plurality of cross members. The use contemplated for this web material at the time was as a barrier tape. FIG. 1(*a*) shows the web deployed across two vertical posts.

Once unrolled, if the tape is pulled both in the downward and longitudinal direction, the web expands to form a cellular structure. FIG. 1(*b*) demonstrates manual deployment of the web. Here, a single row of cells is formed.

FIG. 1(*c*) and FIG. 1(*d*) show alternate embodiments of the fence tape. FIG. 1(*c*) will deploy to a single row of cells with hanging flags. FIG. 1(*d*) will deploy to a double row of cells. It should be apparent that the web material can be widened, and a pattern of slits can be cut into the web material, so that when deployed, a plurality of rows of cells may be formed. The Fence Tape patent also discloses other slit pattern embodiments.

While a tape barrier is a contemplated use for this structure, other uses may be more desirable. Instead of using a flexible plastic tape, a flexible web material fabricated from a paper product that would expand to a cellular structure could create a packing material or an acoustic barrier. If such a web material were expanded, and then folded over or crumpled, the cellular cross-members would snare each other. This crumpled material would be resilient, and could create a shockproof environment for fragile merchandise.

The cells created by the Fence Tape patent when used as a packaging material must necessarily be much smaller and more numerous than when used as a barrier. This can be accomplished by cutting smaller more numerous slits that are positioned along the web material.

The Expandable Web Application disclosed a web material with slits cut in a "tilde" pattern. Each tilde consists of a top leg and an essentially parallel bottom leg connected together by a transversal. The tilde slits are situated in rows where the top leg of each tilde is positioned above the bottom leg of the preceding tilde. Each succeeding row is offset from the preceding row such that the transversals of the tildes are linearly arranged. This structure is shown in FIG. 2. The advantage of this structure is that the cells are more closely packed, and the bonds between the cells formed by crumpling are much stronger than the fence tape structure.

The web material of the Expandable Web Application either may be borderless, as shown in FIG. 2 or may have longitudinal borders, 1, as shown in FIG. 3. The rows of tilde slits need not be parallel to the longitudinal direction. This type of web material is shown in FIG. 4. The material of FIG. 4 either may be borderless, or may have longitudinal borders, 1, as shown in FIG. 5. Sometimes borders may provide strength to prevent tearing the material during deployment. Placing two sheets of expanded web material on top of each other, and crumpling the sheets together provides increased strength and spring-like resilience. This effect is enhanced if the angles of the tilde rows are different in both sheets. For example, if one sheet has rows of tildes parallel to the longitudinal direction, as in FIG. 2, and the other sheet has rows that are angularly offset as in FIG. 4, the combination of both sheets will provide maximum resilience and strength.

FIG. 6 shows a portion of web material with rows of tildes situated longitudinally. FIG. 7 shows its cellular structure once expanded. The cell structure is such that when the material is crumpled, a three-dimensional structure is formed as in FIG. 8. This three-dimensional structure provides the spring-like resilience.

The '822 Application and the Priority Provisional Application disclose a dispenser to deploy and expand the web material of the Expandable Web Application. It is to be used primarily with manual deployment of the webbing. The '106 Application disclosed an improved dispenser that could deploy the webbing manually or automatically using a motor. However, its primary application was to deploy the web material of the Expandable Web Application where the webbing had longitudinal borders. The Present Application improves upon the '106 Application by disclosing an apparatus that can expand any web material, including "fence tape" webbing, either with or without longitudinal borders, and either with manual deployment or continuous deployment driven by an electric motor.

SUMMARY OF THE INVENTION

The Present Invention discloses a dispensing mechanism that deploys a roll of web material having slit cuts and expands it into a web with a cellular structure. This is accomplished by mounting the roll of unexpanded web material on an axle that is positioned at a first acute angle to a guide wheel assembly. The material moves through the guide wheel assembly longitudinally in such a way that tension is applied at a second acute angle to the direction of motion. This diagonal tension causes the web material to expand and form cells.

BRIEF DESCRIPTION OF THE DRAWINGS

FIG. 1(*a*) shows unexpanded web material designed to produce a single row of cells.

FIG. 1(*b*) shows the cellular structure created by expanding the web material of FIG. 1(*a*).

FIG. 1(*c*) is an alternate embodiment of the unexpanded web material that, when expanded, produces a single row of cells and hanging flags.

FIG. 1(*d*) is another alternate embodiment of the unexpanded web material that when expanded, produces two rows of cells.

FIG. 19 is an isometric rear view of the mount for the motor and guide wheel assembly.

FIG. 20 is an isometric view of the rear of the mounted motor and guide wheel assembly.

FIG. 21 is an isometric view of the bottom of the mounted motor and guide wheel assembly.

FIG. 33 is a side elevation showing deployment of a double roll of web material.

FIG. 34 is a side elevation showing deployment of two double rolls of web material.

FIG. 35 is a side elevation showing deployment of three double rolls of web material.

DETAILED DESCRIPTION OF THE INVENTION

Figure 1A:
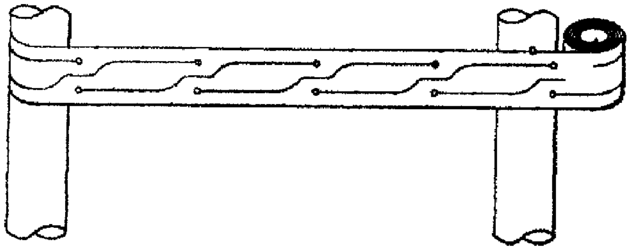
FIG. 1 shows the web material of the Fence Tape patent.
Figure 1B:
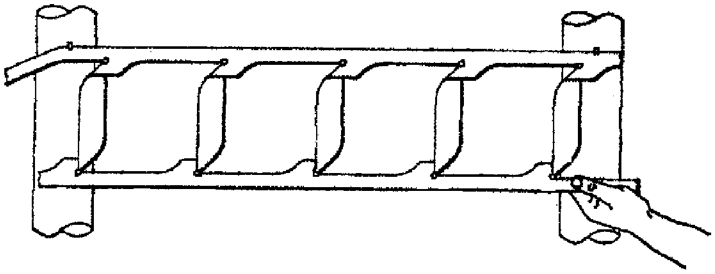
Figure 1C:
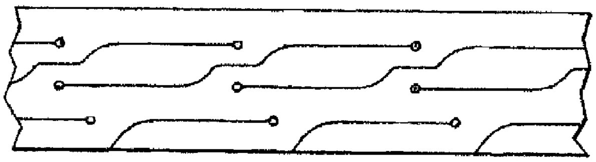
Figure 1D:
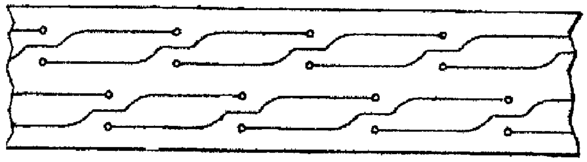
Figure 2:
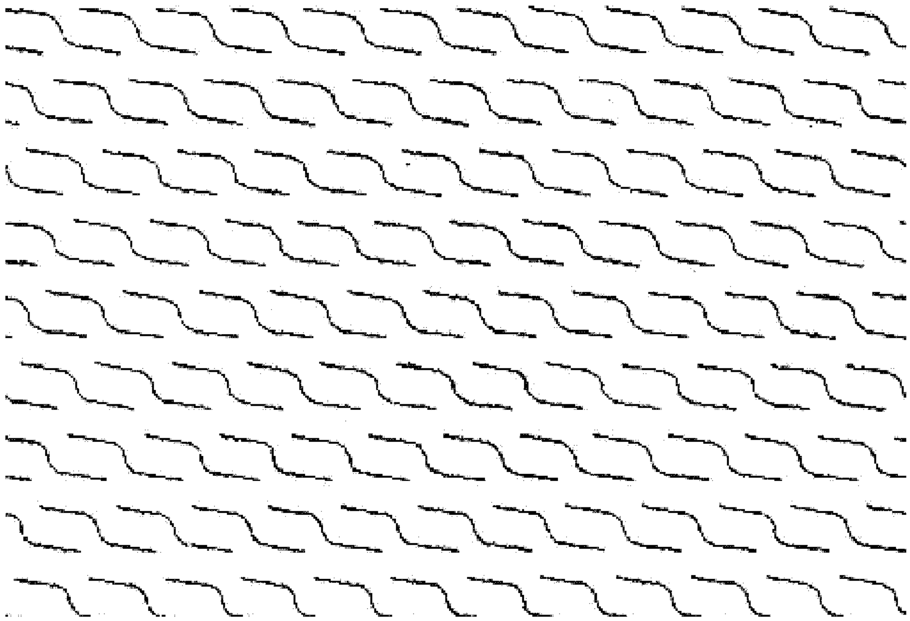
FIG. 2 shows a portion of the web material having the tilde slit pattern of the Expandable Web Application. The webbing has no borders, and the rows of tilde slits are oriented in the longitudinal direction.
Figure 3:
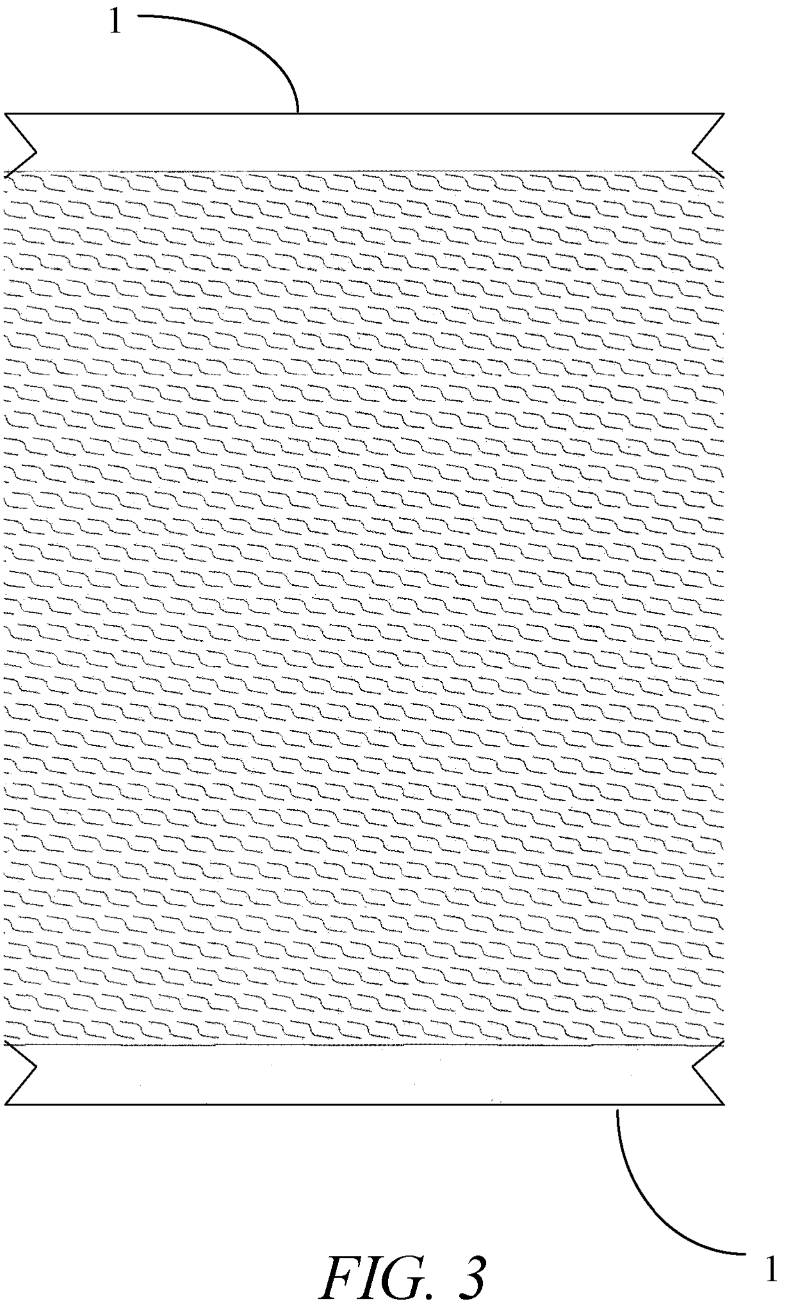
FIG. 3 shows the material of FIG. 2 having two oppositely positioned longitudinal borders.
Figure 4:
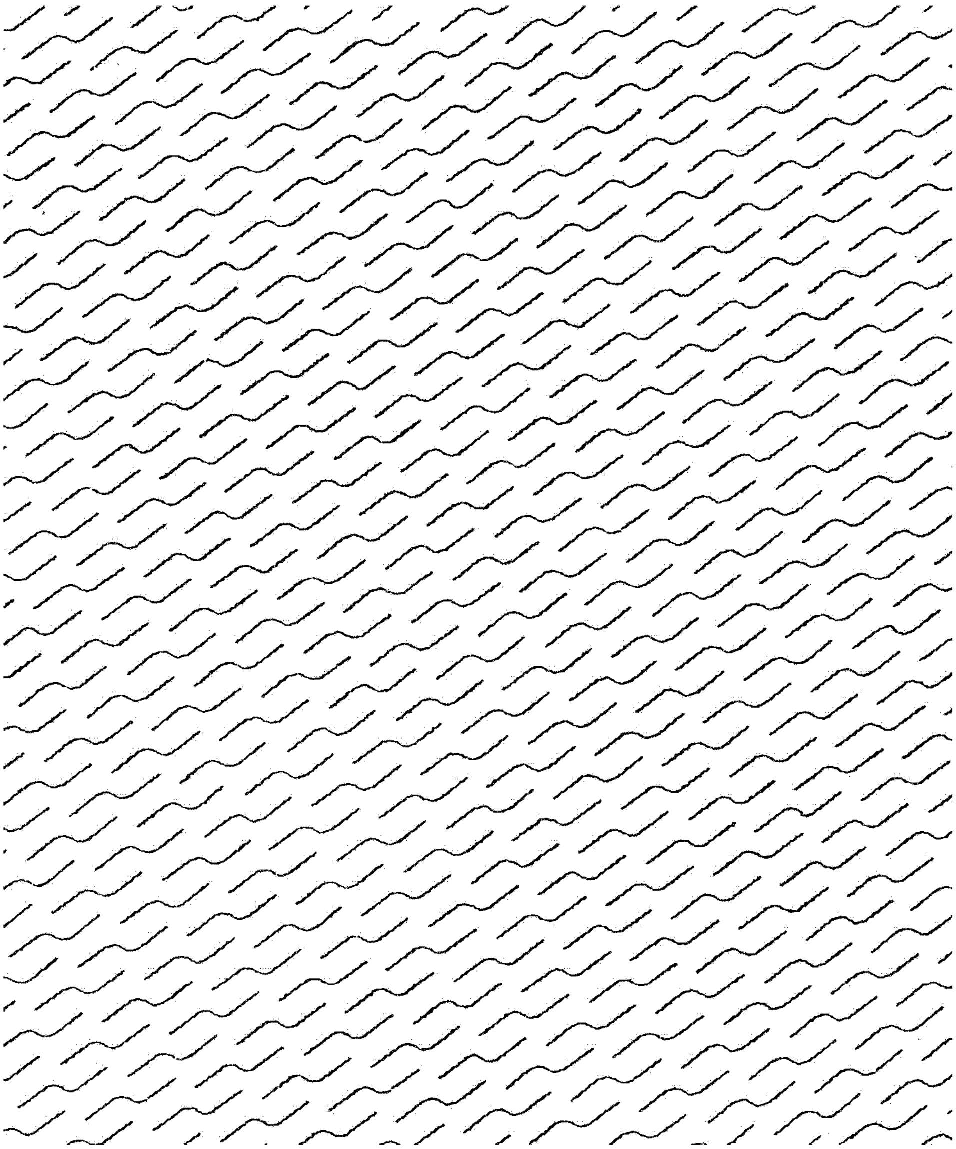
FIG. 4 shows a portion of the web material having the tilde slit pattern of the Expandable Web Application. The webbing has no borders, and the rows of tilde slits are oriented transverse to the longitudinal direction.
Figure 5:
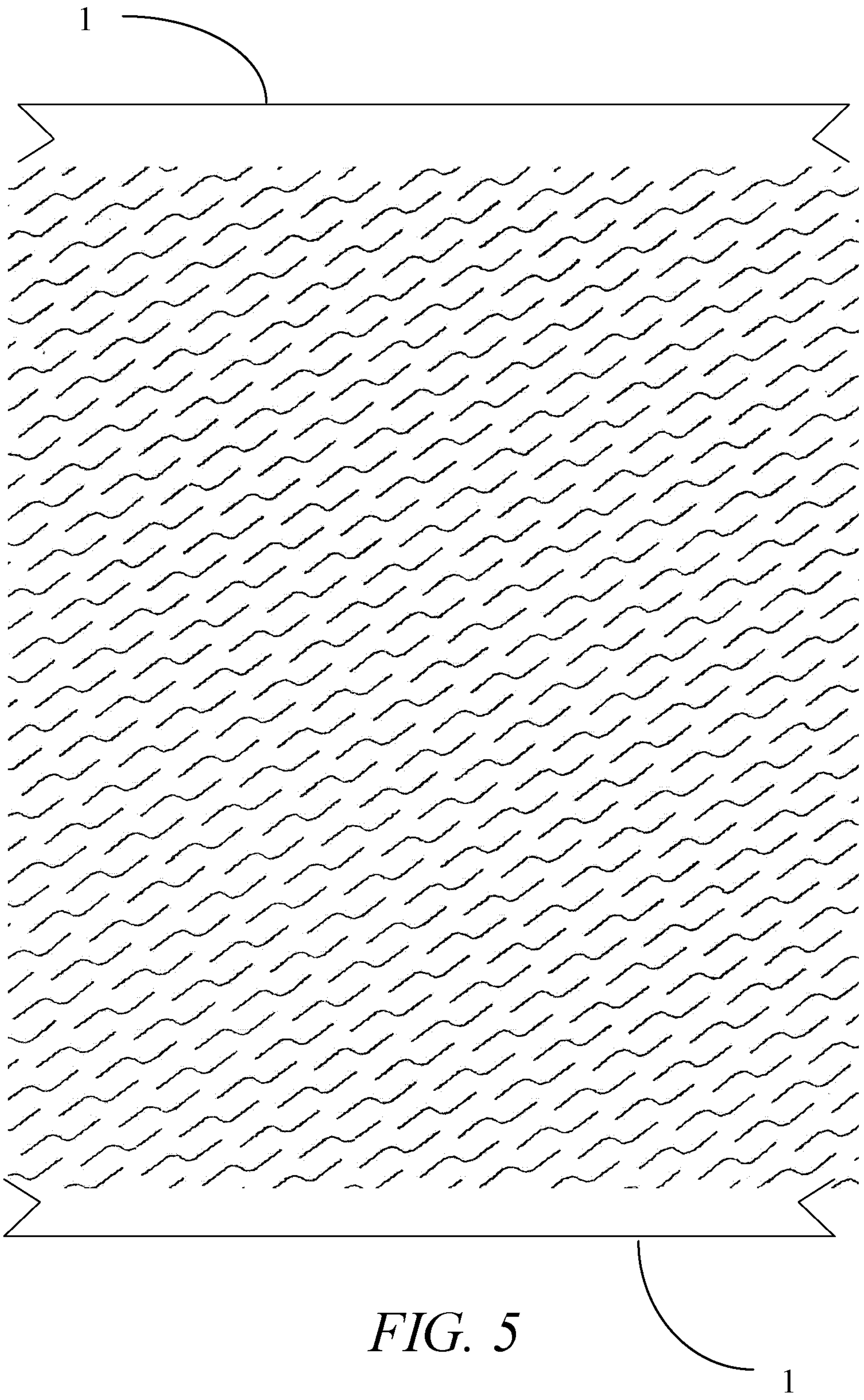
FIG. 5 shows the material of FIG. 4 having two oppositely positioned longitudinal borders.
Figure 6:
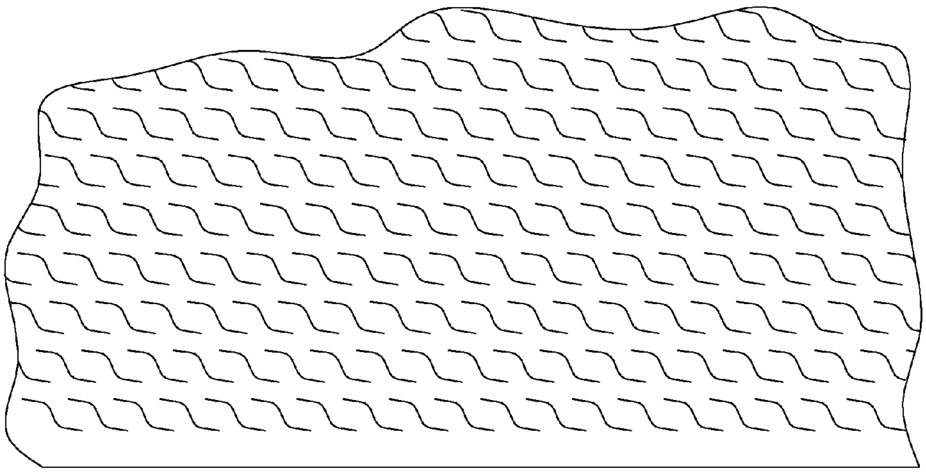
FIG. 6 shows a portion of the material of FIG. 3.
Figure 7:
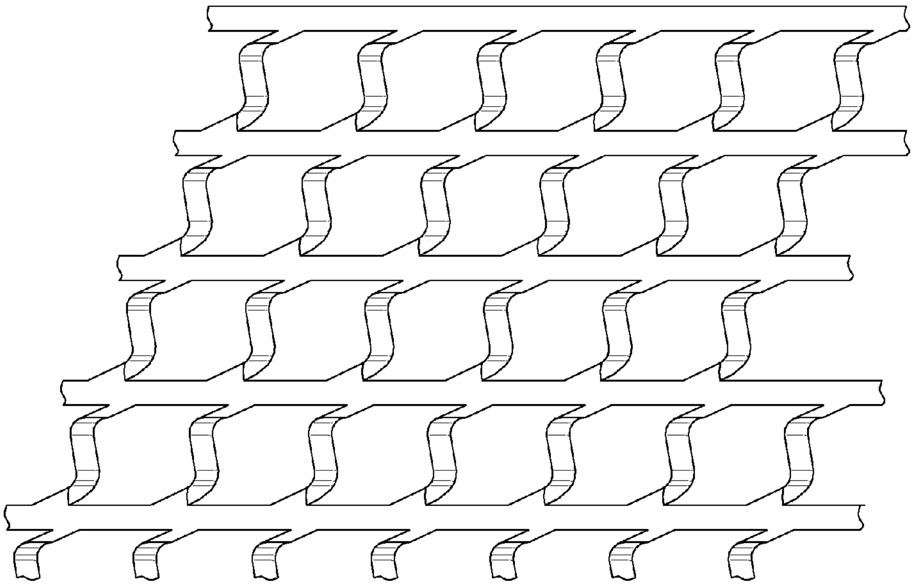
FIG. 7 shows the cellular structure after expansion of the material of FIG. 6.
Figure 8:
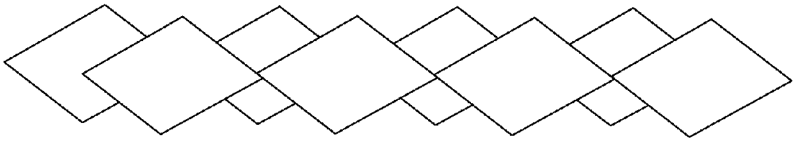
FIG. 8 is a side elevation of the crumpled material of FIG. 7, showing the three-dimensional spring-like structure.
Figure 9:
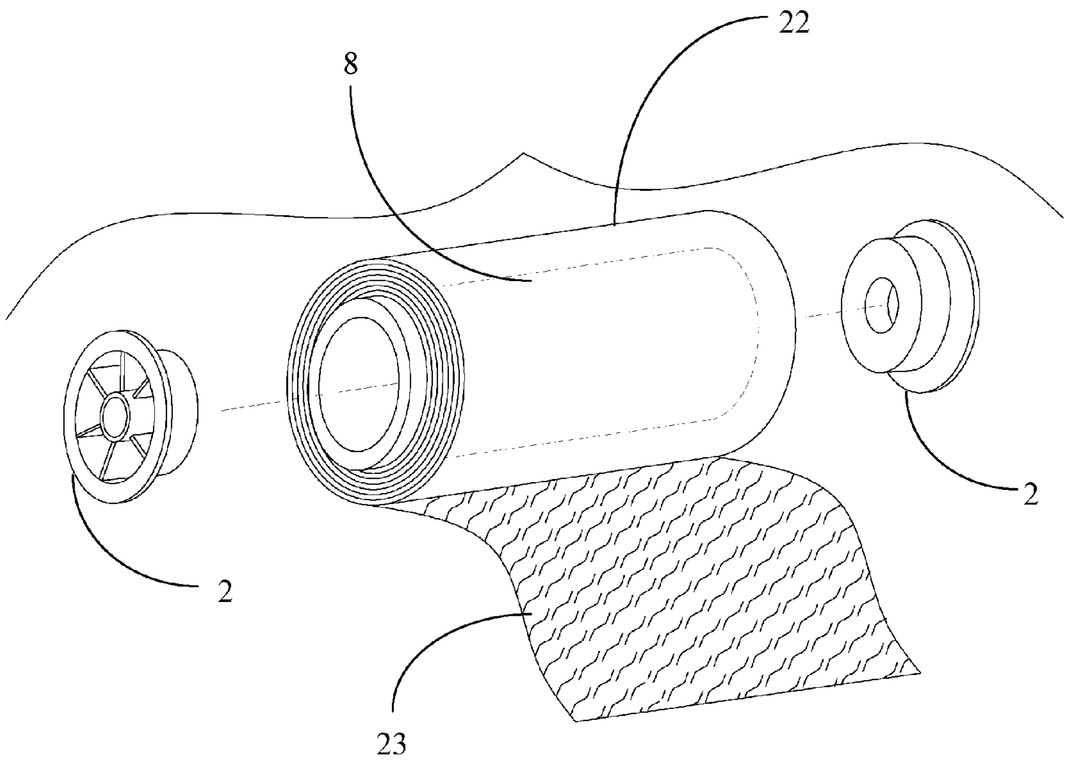
FIG. 9 shows a roll of the web material of the Expandable Web Application with two core plugs.

Referring to FIG. 9, the web material, 23, is rolled longitudinally around cardboard core, 8, to form webbing roll, 22. Prior to mounting on the Apparatus of the Present Invention, two core plugs, 2, are inserted into the ends of cardboard core,

8. The core plugs fit tightly into the cardboard core. The core plugs each have a through hole so that the roll can be mounted on an axle of the Present Invention for deployment.

Figure 10:
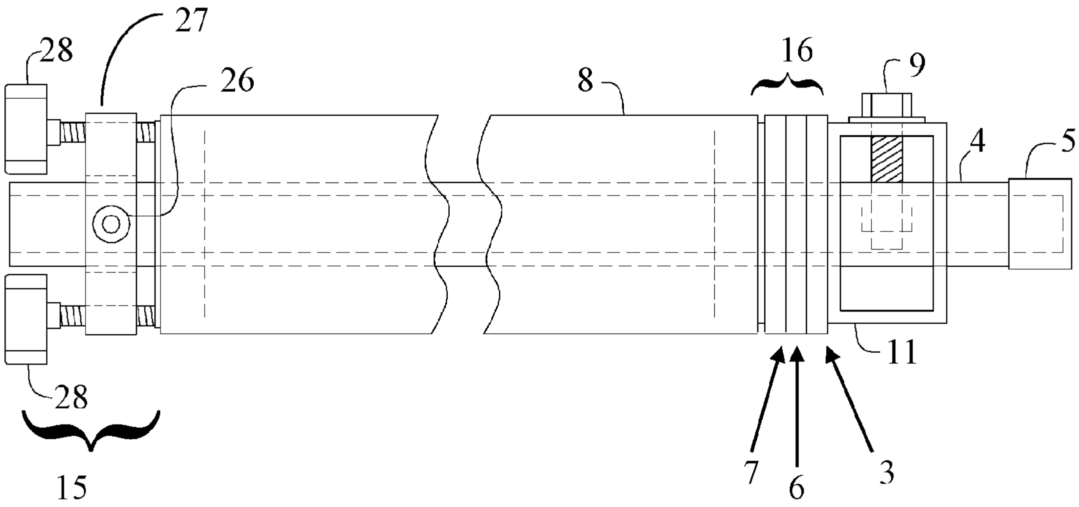
FIG. 10 shows the mounting of the cardboard core of the web material of FIG. 9 on an axle of the Present Invention.

FIG. 10 shows how the webbing roll is mounted on an axle. For clarity sake, the entire webbing roll, 22, is not shown in this drawing. Instead, only cardboard core, 8, is shown mounted on axle, 4. However, during operation, web material, 23, would be rolled around the cardboard core. Axle, 4, is secured to a vertical post, 11, using bolt, 9. An end plug, 5, covers the end of axle, 4.

A break pad assembly, 16, is mounted to vertical post, 11. Break pad assembly, 16, comprises three rectangular plates:

an outer steel backup plate, 3, in direct contact with vertical post, 11;

a plate made of rubber (or other elastic material), 6, sandwiched between the two outer plates, the elastic resilience of which increases as more pressure is applied; and an outer plastic break pad or wear plate, 7, (i.e., the component part of the break in contact with the core plug).

On the other end of cardboard core, 8, is a break pressure adjuster assembly, 15, comprising:

mounting pin, 26;

plastic cylinder, 27; and two bolts, 28, each having a lobed knob for ease of manual screwing.

The plastic break pad, 7, of break pad assembly, 16, is in direct contact with one core plug, 2 (shown as hidden), and the two bolts, 28, are in direct contact with the other core plug, 2 (shown as hidden). By manually tightening or loosening bolts, 28, breaking pressure on the core plugs, 2, can be controlled, thereby also controlling the speed of deployment of the web material, 23.

Figure 11:
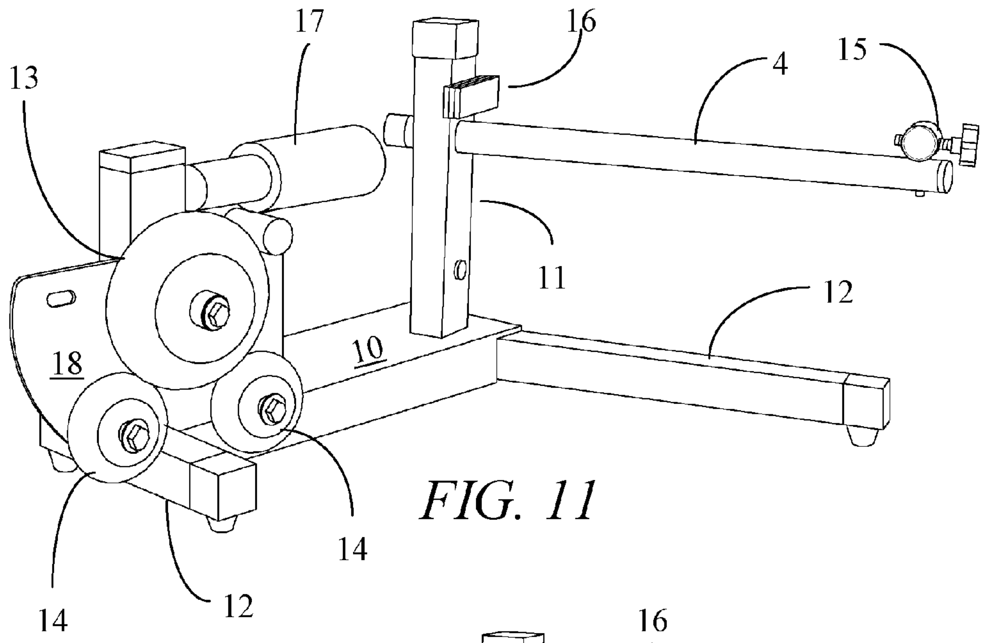
FIG. 11 is an isometric view of the first embodiment of the single axle dispenser of the Present Invention.

FIG. 10 and FIG. 11 show two embodiments of a single axle Apparatus of the Present Invention. The difference between the two embodiments is how an electric motor and guide wheel assembly is mounted to the base. Both embodiments comprise a base, 10, having two support members, 12. One support member is larger than the other. A vertical post, 11, is mounted to the base, 10, near the larger support member, 12. Axle, 4, is inserted into vertical post, 11. For stability, axle 4 and larger support member 12 are parallel to each other and both located in the same vertical plane. As will be discussed later, that vertical plane is not perpendicular to the direction of deployment of the web material. Break pad assembly, 16, is shown mounted to vertical post, 11; and break pressure adjuster assembly, 15, is shown mounted on axle 4.

An electric motor, 17, and guide wheel assembly are shown mounted to the base, 10, just above the smaller support member, 12. The guide wheel assembly comprises three wheels—a torus, 13, and two annular cylinders, 14. While all three wheels are mounted vertically, they are not all in the same plane. Smaller wheels, 14, are located in the same plane, which is forward of wheel, 13. However, both smaller wheels, 14, are in contact with the larger wheel, 13. The web material is threaded through the guide wheel assembly, which grasps the web material, 23, and allows it to be deployed.

Figure 12:
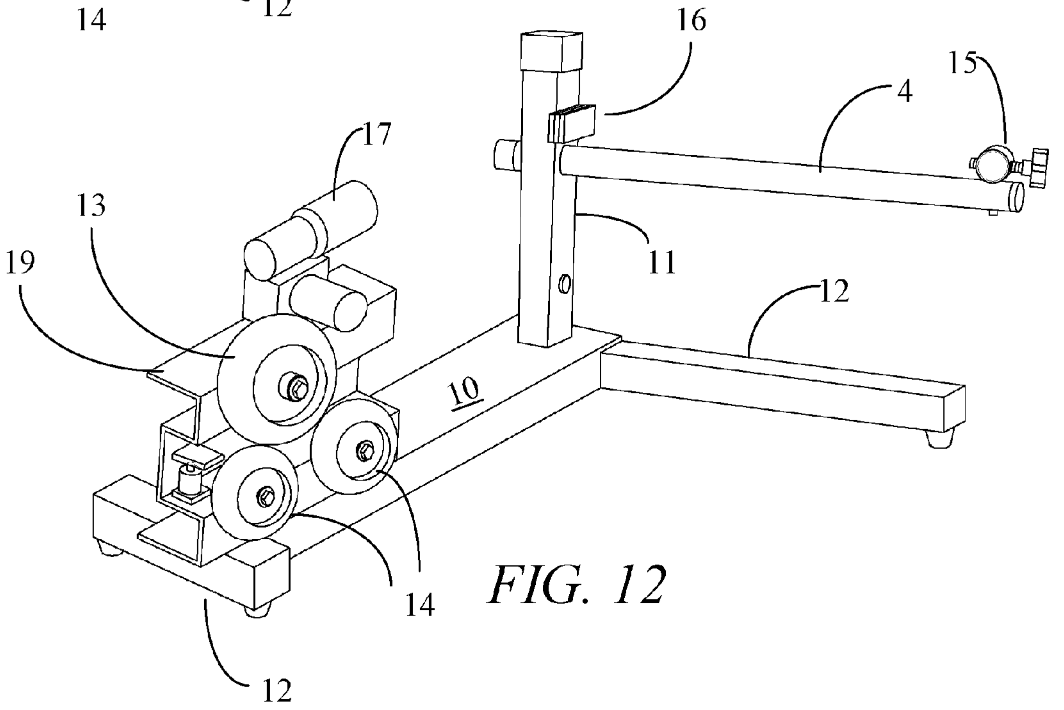
FIG. 12 is an isometric view of the second embodiment of the single axle dispenser of the Present Invention.

FIG. 11, the first embodiment, shows the motor, 17, and guide wheels, 13 and 14, mounted to a mounting plate 18. FIG. 12, the second embodiment, shows the motor and guide wheels mounted to a square wave support, 19.

Figure 13:
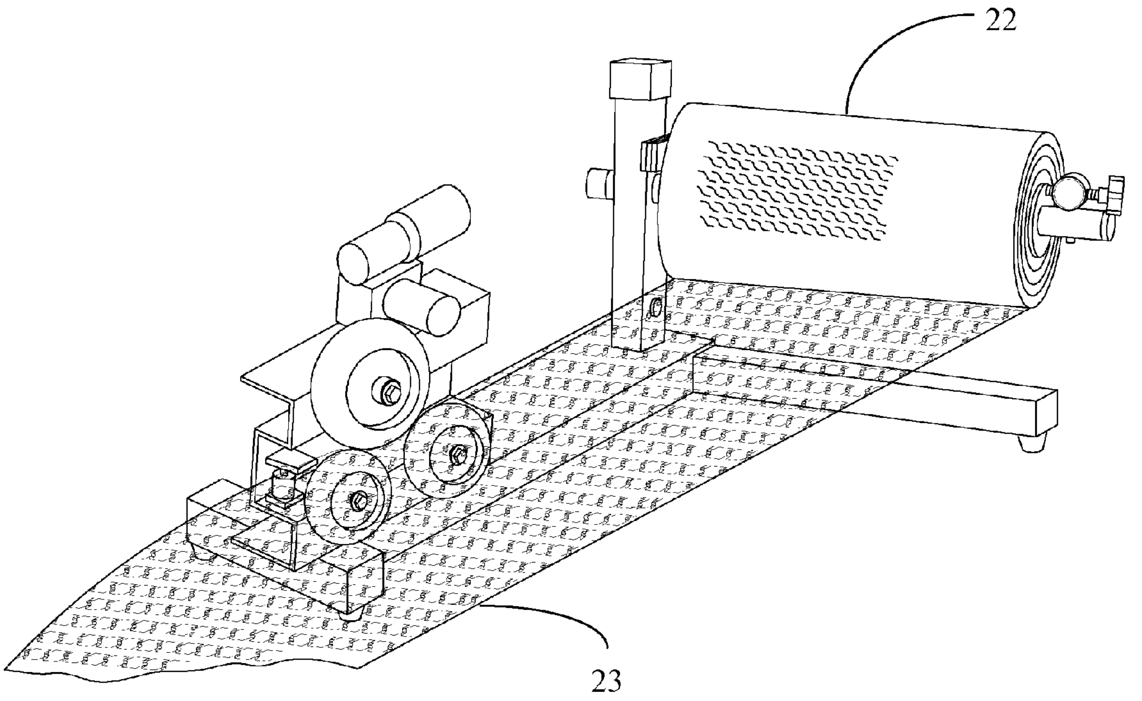
FIG. 13 is an isometric view showing deployment and expansion of web material using the second embodiment of the single axle dispenser.

FIG. 13 illustrates deployment and expansion of web material, 23, from roll, 22, through the Apparatus of the Present Invention. The web material on roll, 22, is unexpanded, while the off-wound web material is expanded. The cell structure is evident in FIG. 13.

Figure 14:
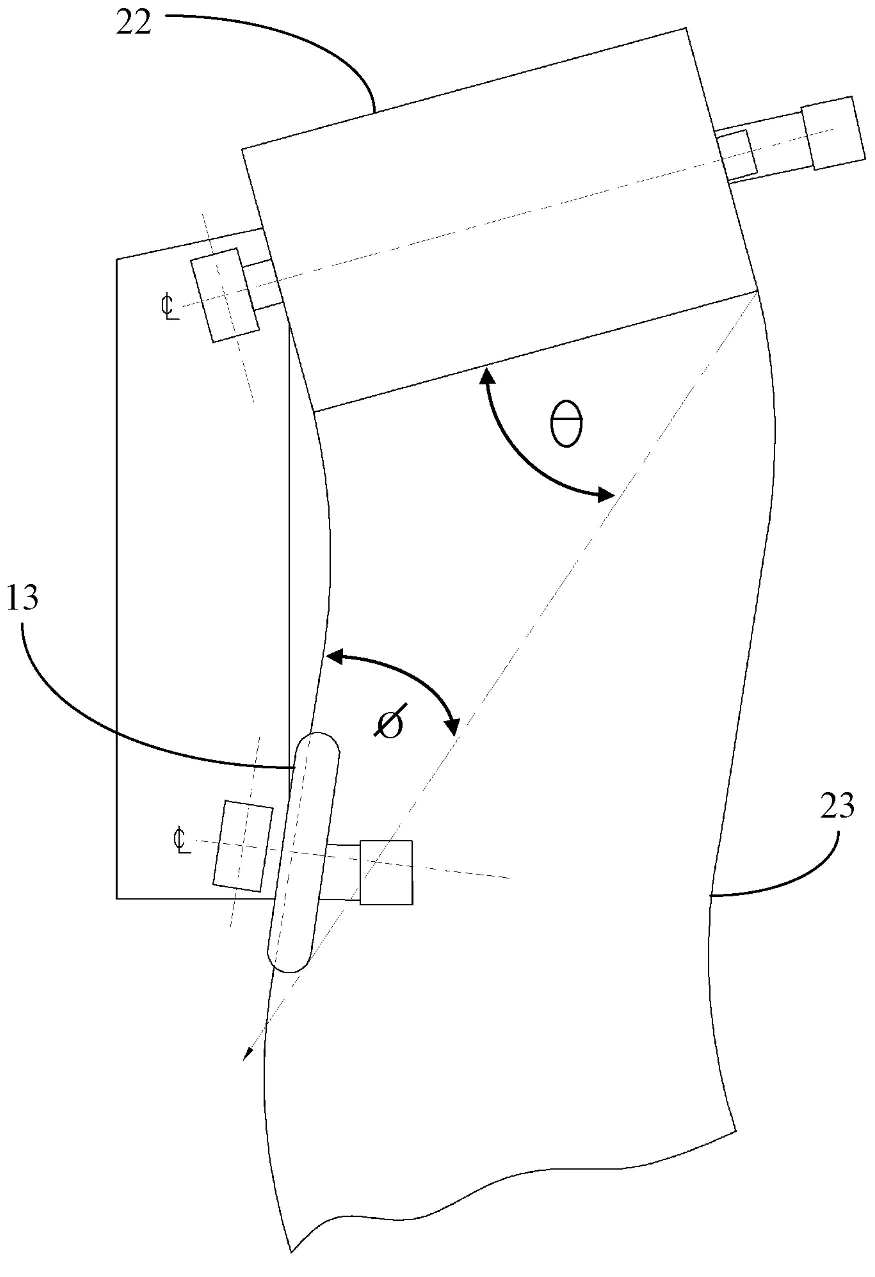
FIG. 14 is a top plan view showing a schematic that demonstrates how the web material is expanded during deployment.

FIG. 14 is a top plan schematic that demonstrates how web material, 23, expands as it is deployed from roll, 22. The essential part of the Apparatus of the Present Invention is that the axle, 4, is not parallel to the axis perpendicular to the guide wheel assembly. They are askew to each other. Consequently, as the web material, 23, is unwound from roll, 22, a tension is created in the web material along a transversal to the longitudinal direction of travel. The axle forms an angle, θ, to the transversal, and the guide wheel assembly forms an angle, ϕ, to the transversal. The diagonal tension causes the web material, 23, to expand, thereby forming the cellular structure.

Figure 15:
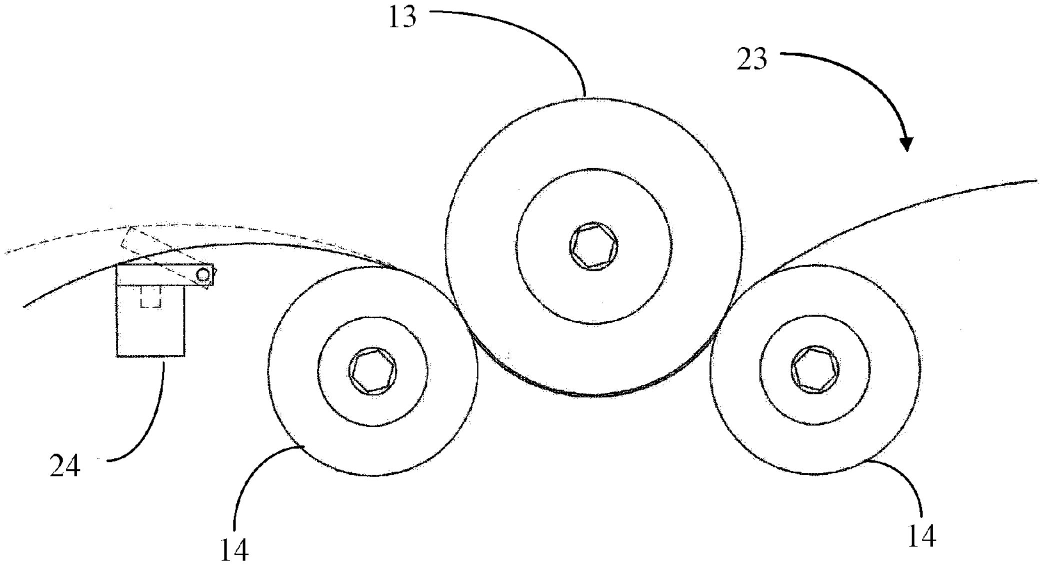
FIG. 15 is a front elevation schematic showing the guide wheel assembly and electric motor switch with web material being fed through the assembly.

FIG. 15 is an elevation schematic showing the web material, 23, being grasped between guide wheels, 13 and 14, and fed through the guide wheel assembly. Trip switch, 24, controls operation of motor, 17 (not shown).

Figure 16:
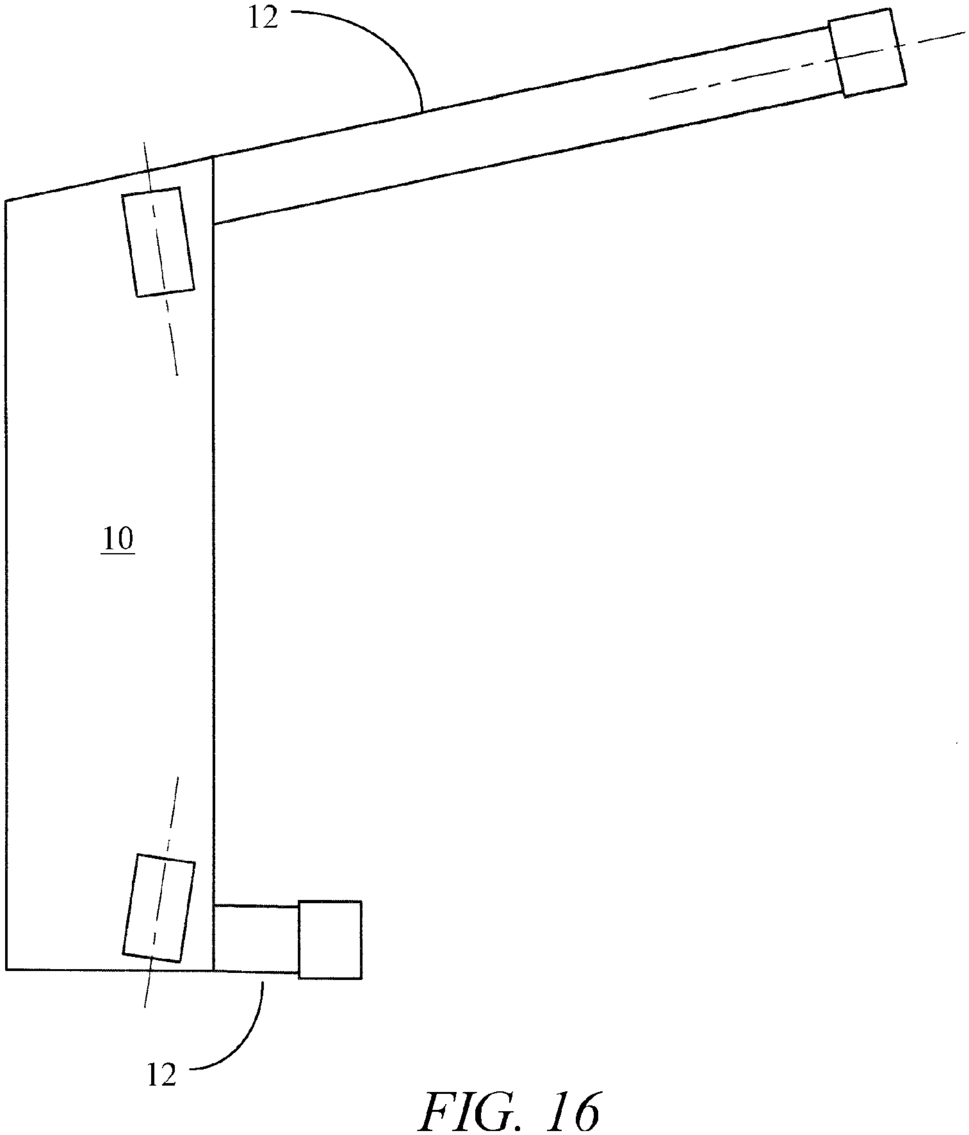
FIG. 16 is a top plan view of the base of the Present Invention.

FIG. 16 is a top plan view of base, 10, and its two support members, 12. Note that the axes of the larger and smaller support members, 12, are not parallel to each other. Furthermore, it can be seen that the axis of axle, 4 (not shown), is askew from the axis of the guide wheel assembly (not shown). Axle, 4, is parallel to larger support member, 12, and both are located on the same vertical plane.

Figure 17:
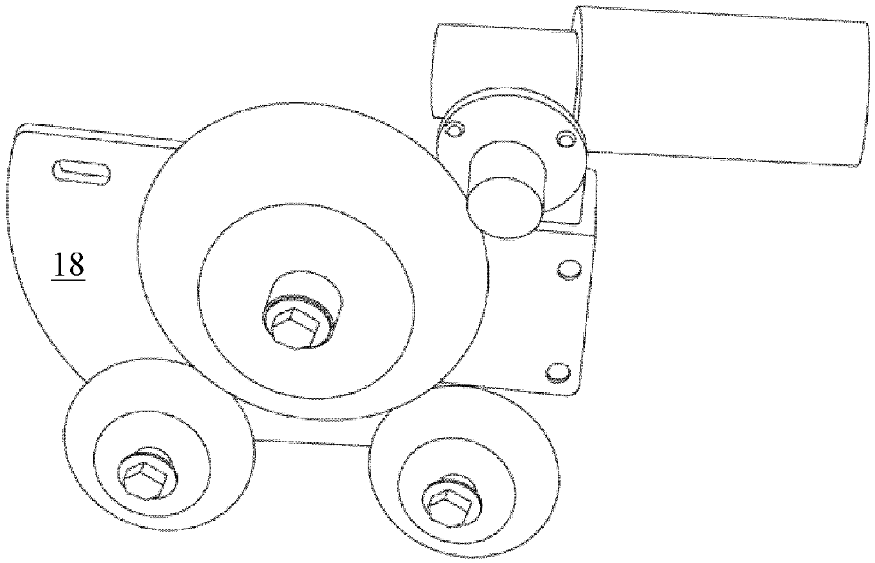
FIG. 17 is an isometric view of the guide wheel assembly and motor mount for the first embodiment.
Figure 18:
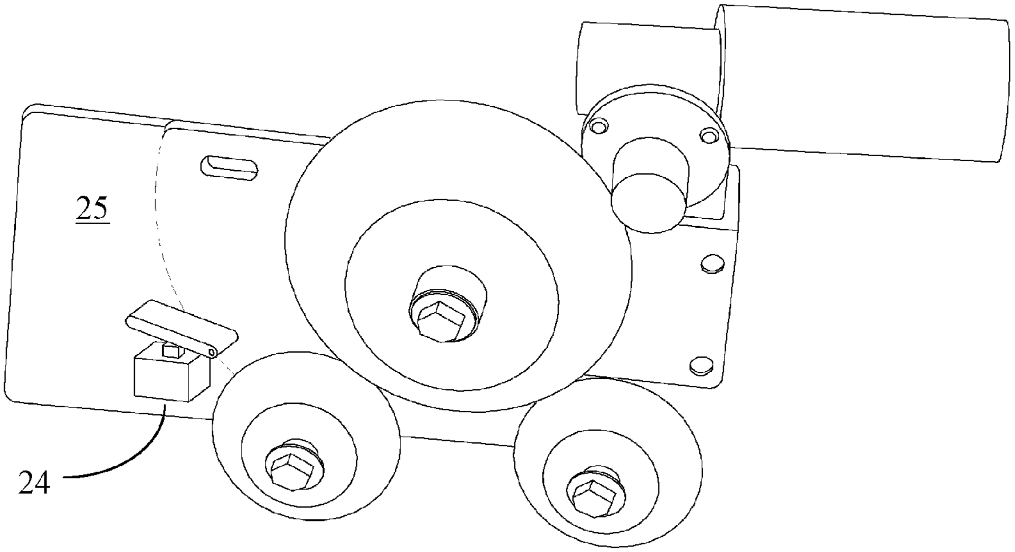
FIG. 18 shows the addition of a mounting plate and an electric motor switch to the guide wheel assembly of FIG. 17.

FIG. 17 and FIG. 18 show two alternate methods of mounting the electric motor and guide wheel assembly for the first embodiment of the Apparatus. In FIG. 17, the motor and guide wheel assembly are mounted to mounting plate, 18, and motor, 17, controlled externally as it rotates guide wheel, 13. In FIG. 18, the motor and guide wheel assembly are mounted to a differently shaped mounting plate, 25, and a pressure switch, 24, is used to control deployment of the web material, 23.

FIG. 19 is an isometric rear view of mounting plate, 18. FIG. 20 is an isometric rear view showing how the motor and guide wheel assembly are mounted to base, 10, using mounting plate, 18. FIG. 21 is an isometric bottom view of the mounting shown in FIG. 20.

Figure 22:
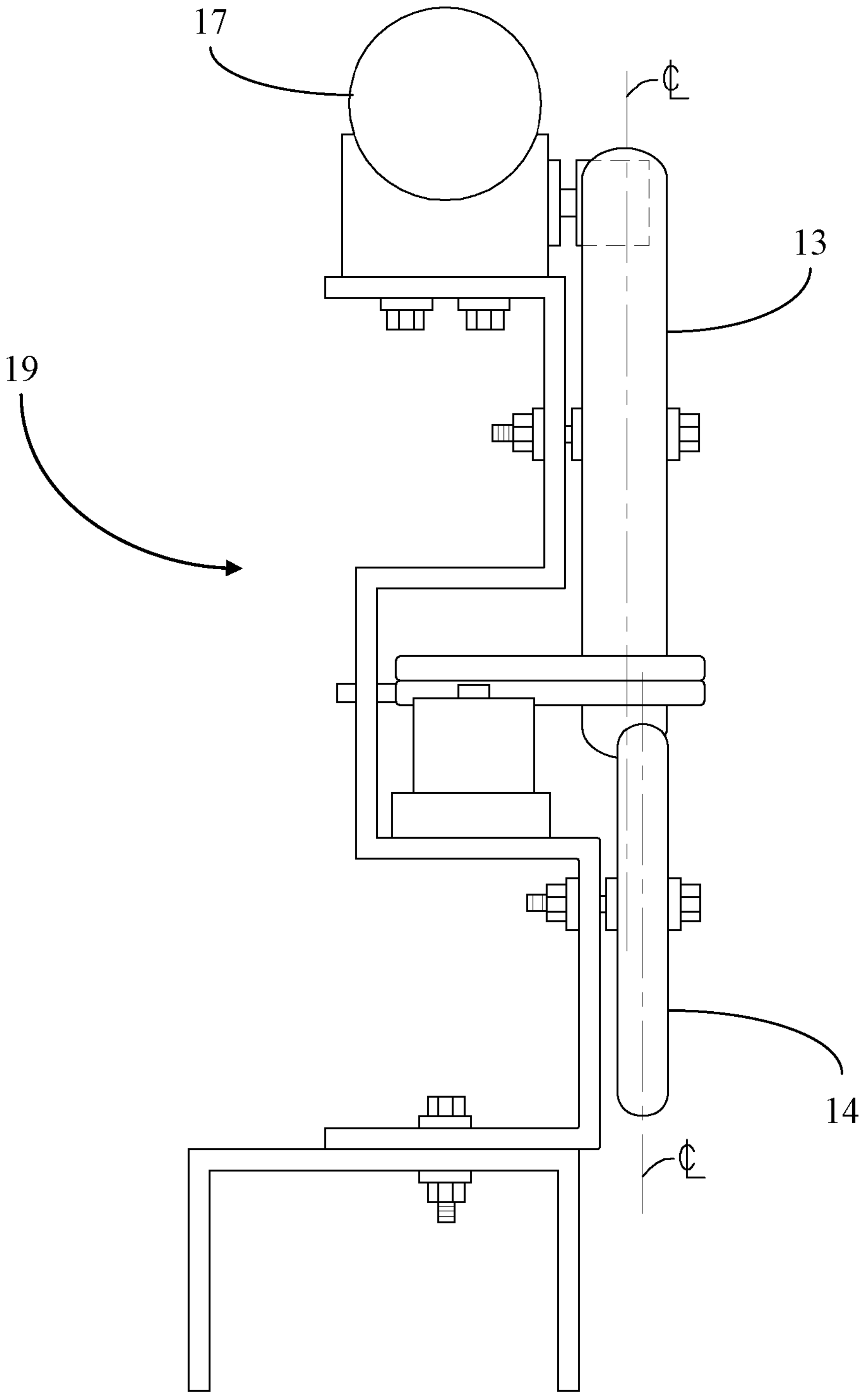
FIG. 22 is a front elevation of the square wave support mounting for the motor and guide wheel assembly used in the second embodiment of the Present Invention.
Figure 23:
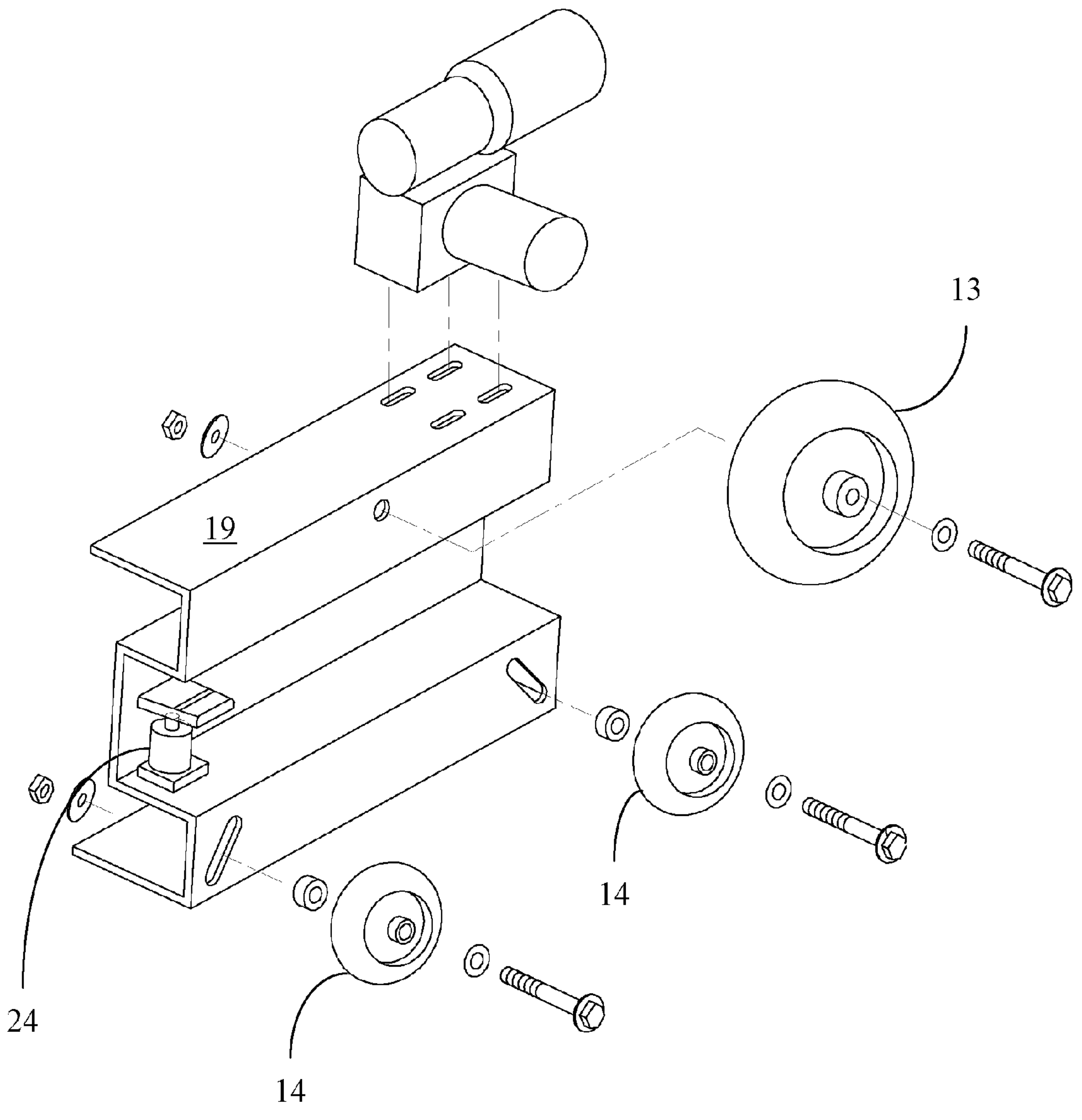
FIG. 23 is an isometric exploded view of the square wave support, the motor, and the guide wheel assembly.

FIG. 22 is a side elevation showing the square wave support, 19, of the second embodiment of the Present Invention. The square wave support, 19, is bolt-mounted to base, 10. Electric motor, 17, is bolt-mounted to the top of the support. Guide wheels, 13 and 14, are bolt-mounted on two successive peaks of the support, while control switch, 24, is mounted inside a trough between the two peaks. FIG. 23 is an isometric exploded view of square wave support, 19, that shows how the motor, guide wheels, and control switch are mounted thereon.

Figure 24:
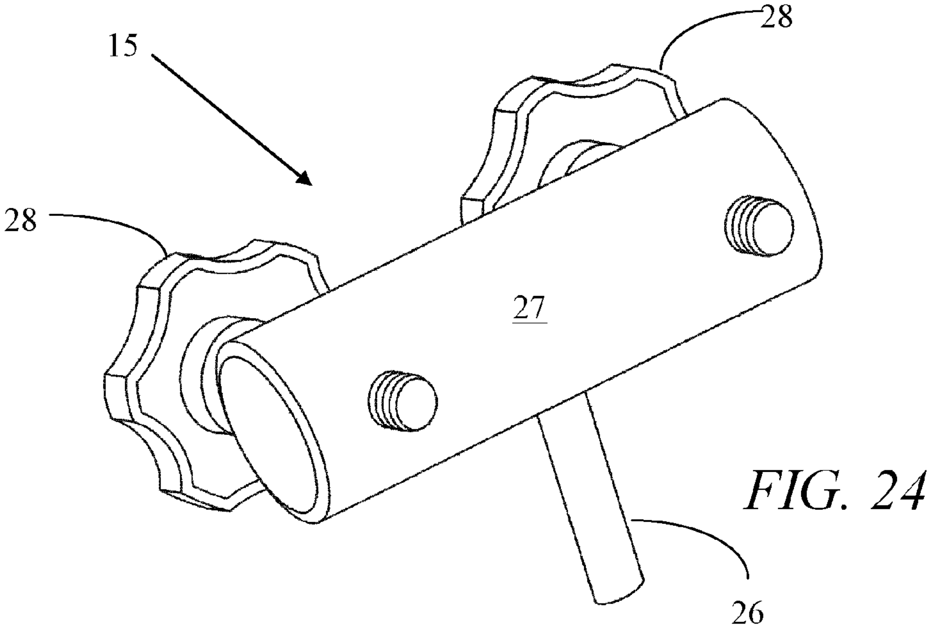
FIG. 24 is an isometric view of the rear of the adjustable break assembly.
Figure 25:
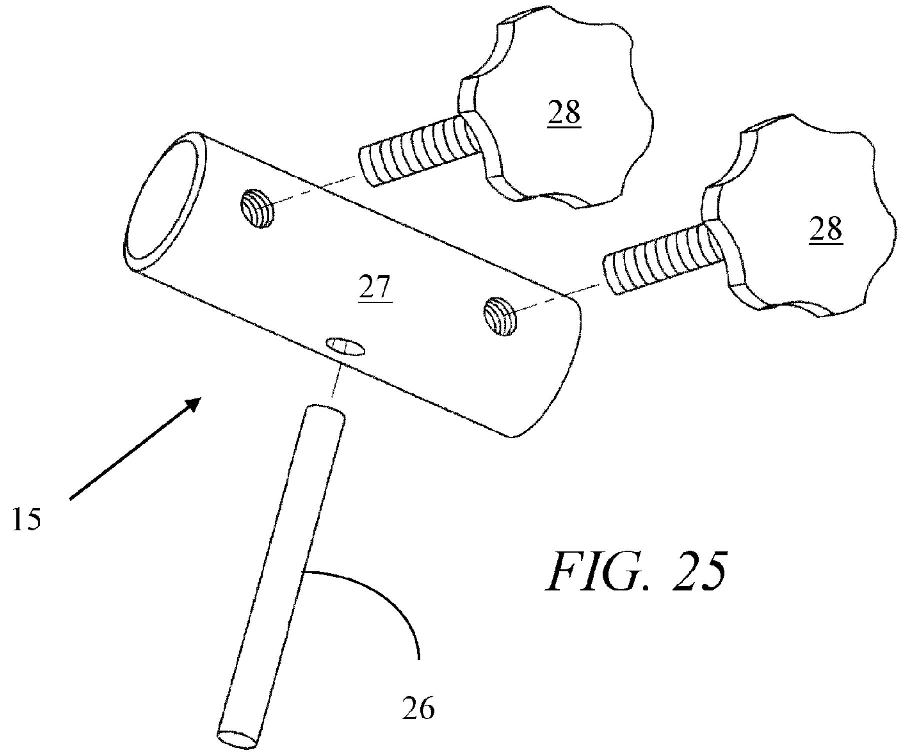
FIG. 25 is an isometric exploded view of the front of the adjustable break assembly.

FIG. 24 and FIG. 25 are isometric views showing details of the break pressure assembly, 15. FIG. 24 is an isometric rear view of the assembly. The contact surfaces of bolts, 28, are shown. The two bolts, 28, are screwed into plastic cylinder, 27, which in turn is inserted into a hole in axle, 4, using rod, 26. FIG. 25 is an isometric front exploded view of the break pressure assembly.

Figure 26:
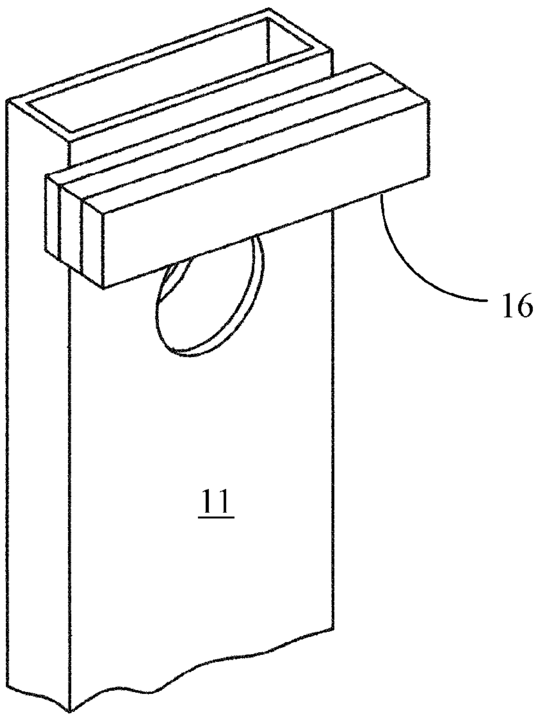
FIG. 26 is an isometric view of the break pads mounted on the vertical post of the Present Invention.

FIG. 26 is an isometric view of the break pad assembly, 16, mounted to vertical post 11. It is mounted to the post immediately above the hole into which axle, 4, is inserted. The three component plates, 3, 6, and 7, are shown in the drawing.

Figure 27:
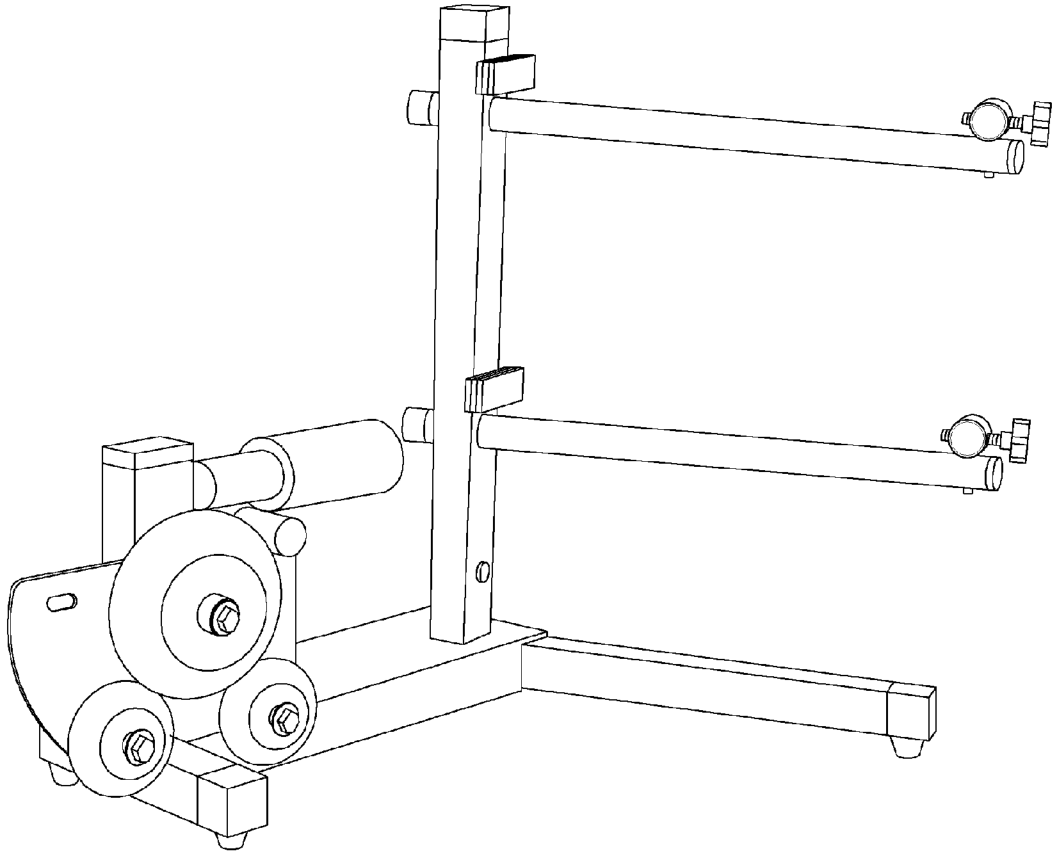
FIG. 27 is an isometric view of the first embodiment of the dual axle Apparatus of the Present Invention.
Figure 28:
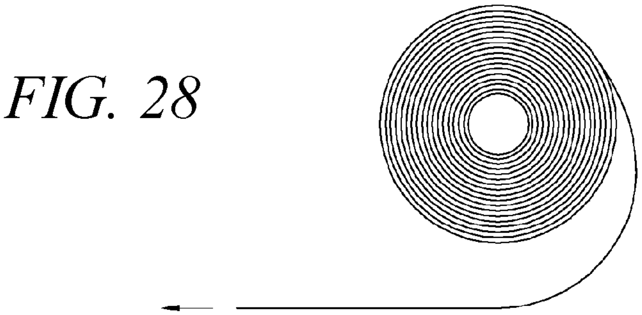
FIG. 28 is a side elevation showing deployment of a single roll of web material.
Figure 29:
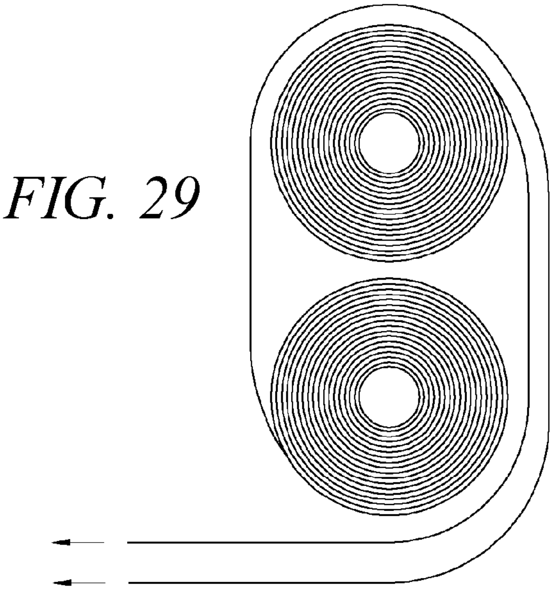
FIG. 29 is a side elevation showing deployment of two rolls of web material.
Figure 30:
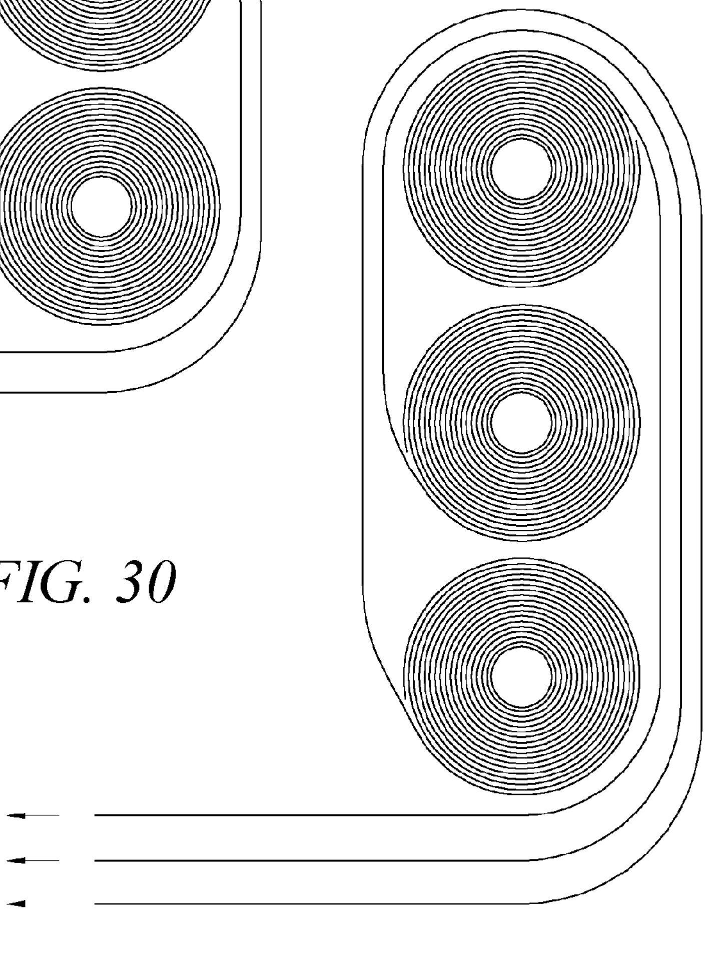
FIG. 30 is a side elevation showing deployment of three rolls of web material.
Figure 31:
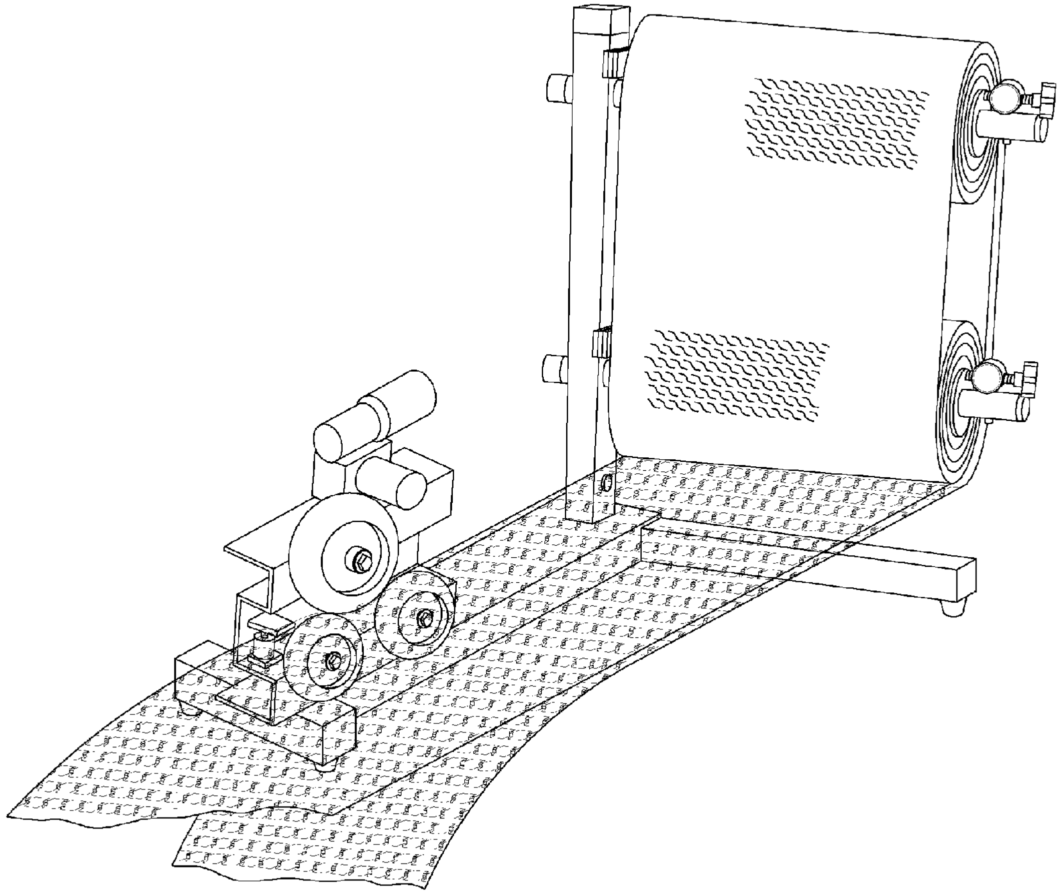
FIG. 31 is an isometric view showing deployment and expansion of web material using the second embodiment of the dual axle Apparatus of the Present Invention.

FIG. 27 is an isometric view of a dual axle version of the Apparatus of the Present Invention. Both axles as well as the larger support member are parallel to each other and in the same vertical plane. That planar direction is skew to the axes of the guide wheel assembly. FIG. 28 is a side elevation showing deployment of a single roll of web material. FIG. 29 is a side elevation showing deployment of two rolls of web material in a dual axle apparatus. FIG. 30 is a side elevation showing deployment of three rolls of web material in a triple axle apparatus. Clearly, the number of axles is limited by the practical size of the Apparatus. FIG. 31 shows two rolls of web material being deployed and expanded through the dual axle version of the Apparatus.

Figure 32:
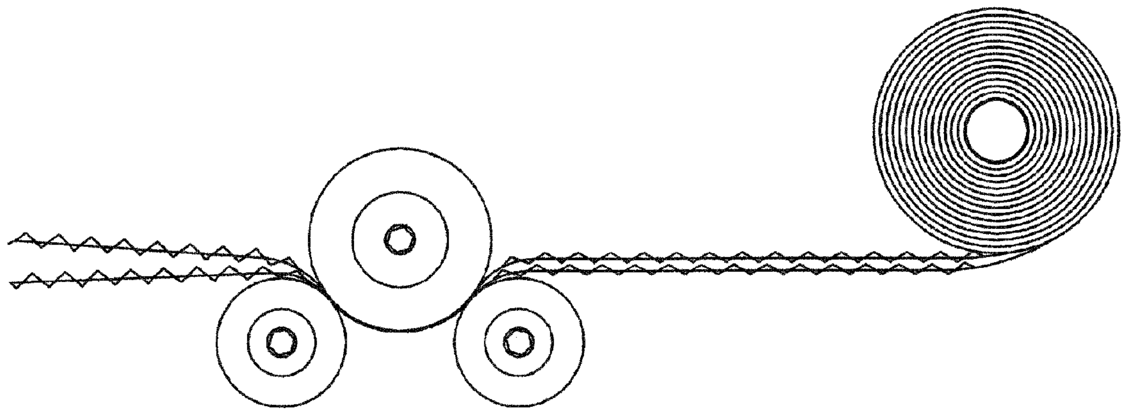
FIG. 32 is a front elevation schematic showing a double roll of web material being deployed through the guide wheel assembly.

A single roll of web material may have two sheets of webbing rolled on the same cardboard core. FIG. 32 is an elevation schematic showing how a single roll of such a roll would feed through the guide wheel assembly for deployment and expansion. A double sheet of web material, once crumpled, will provide greater strength and spring-like resilience. FIG. 33 is an elevation schematic showing how two web sheets would be rolled to form a single roll. Similarly, FIG. 34 shows how two rolls can be used in a dual axle apparatus to produce four sheets of expanded web material. Finally, FIG. 35 shows how three rolls can be used in a triple axle apparatus to produce six sheets of expanded web material.

Figure 36:
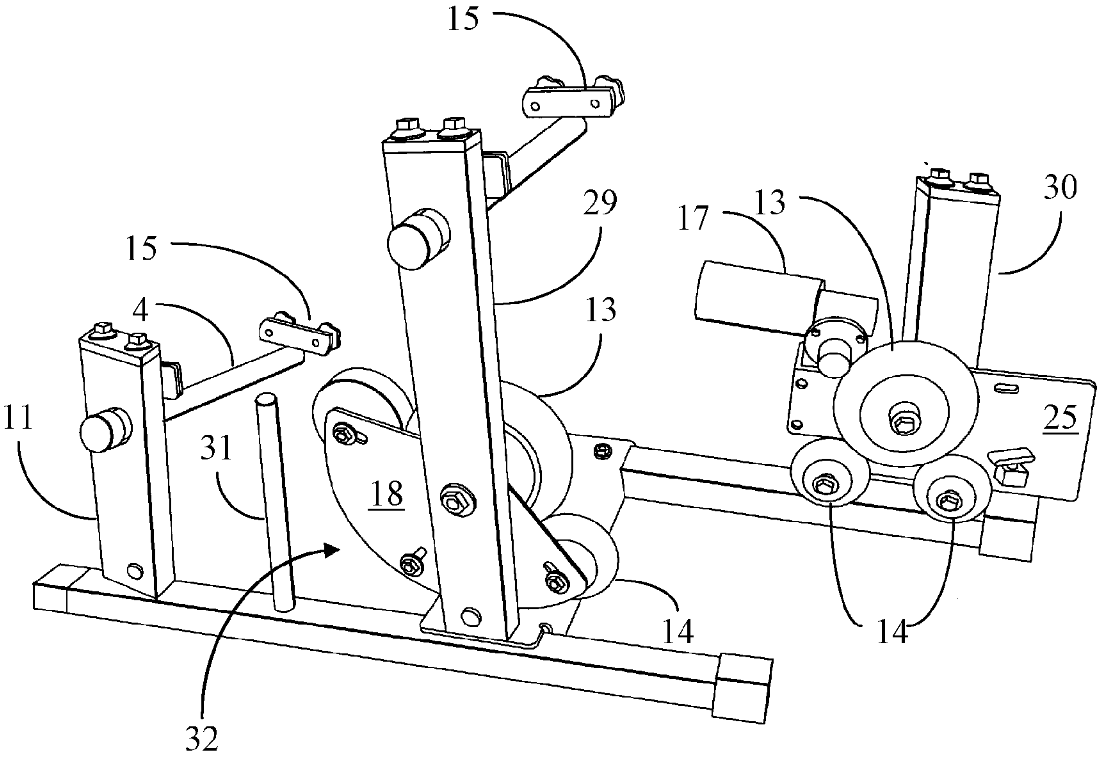
FIG. 36 is an isometric view showing the third embodiment of the dual axle Apparatus of the Present Invention.

FIG. 36 is an isometric view showing a third embodiment of the dual axle Apparatus of the Present Invention. Here, the two axles are mounted on separate posts, and their angles to the direction of deployment of the web material differ. Axle, 4, is mounted on vertical post, 11, to a base cross member in a similar manner as shown in FIGS. 11-14. Axle, 4, is situated at an angle that is not perpendicular to the direction of deployment. Post, 11, is positioned at the rear of the Apparatus. A second vertical post, 29, with its own axle is positioned forward of post, 11, on the same cross member of the base and to the base itself. In this embodiment, the axle mounted on post, 29, is perpendicular to the direction of deployment. Both posts and axles each have associated braking assemblies. This embodiment is designed primarily to deploy two single web rolls together. In this embodiment, an idler wheel assembly, 32, is located at the bottom of post, 29, to serve as a guide mechanism for deployment of the forward roll. It is completely passive, as it does not pull the web material. It consists of the three wheels, 13 and 14, mounted to plate, 18. Vertical post, 30, is mounted to a second cross member positioned at the opposite side of the base. Mounted to post, 30, is the motorized guide wheel assembly shown in FIG. 18. Note that the axle of post, 29, is mounted at a higher position relative to the axle of post, 11. This is done to prevent interaction of the web rolls mounted on their axles. A guidepost, 31, is used to guide the movement of the web roll mounted on axle, 4.

Figure 37:
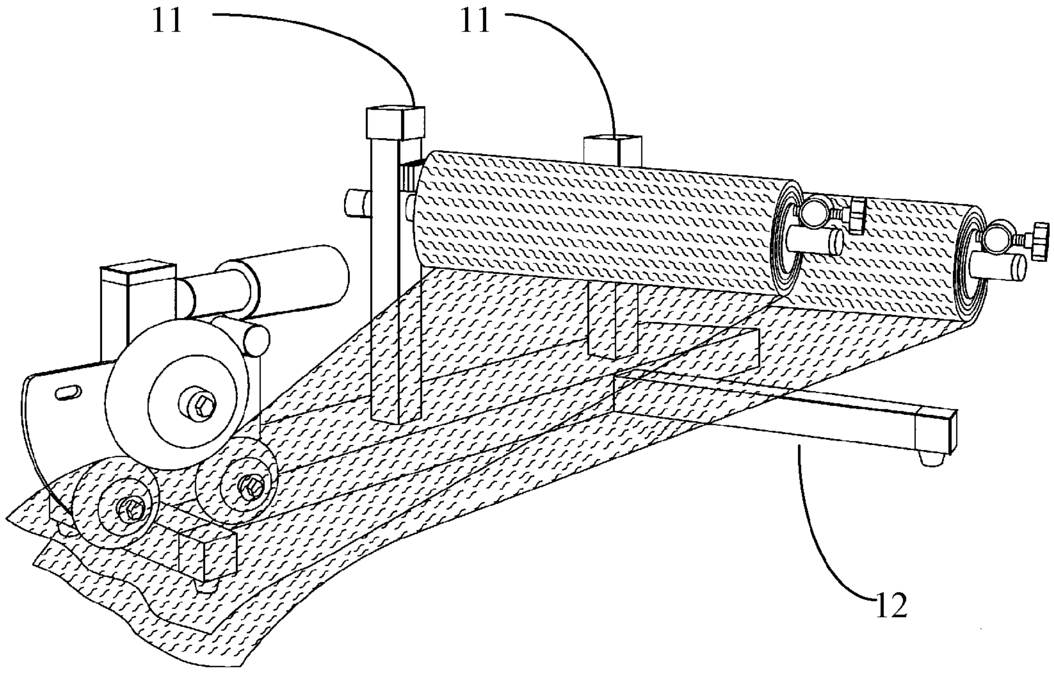
FIG. 37 is an isometric view showing deployment and expansion of web material using the fourth embodiment of the dual axle Apparatus of the Present Invention.
Figure 38A:
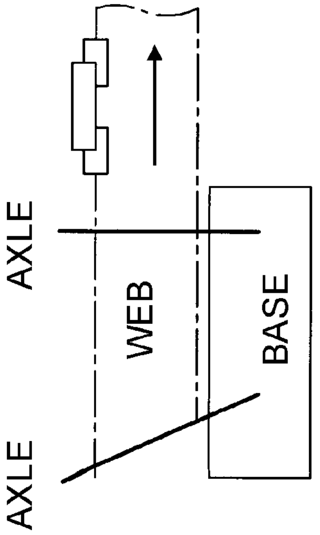
FIG. 38 shows a series of twelve schematic diagrams illustrating the various embodiments of the dual axle Apparatus of the Present Invention.
Figure 38B:
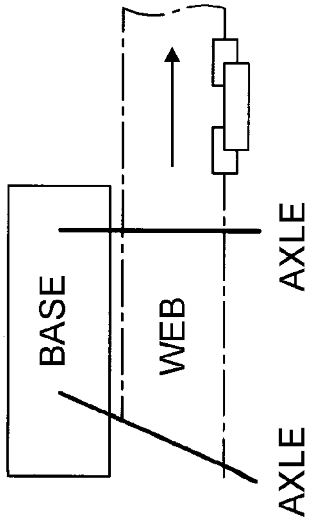
Figure 38C:
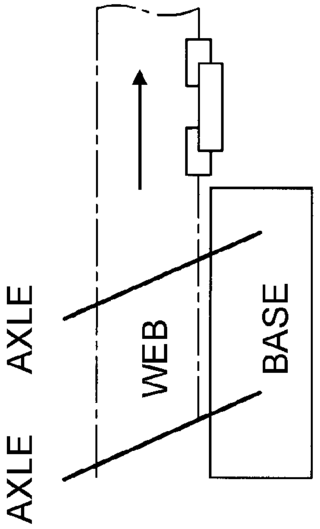
Figure 38D:
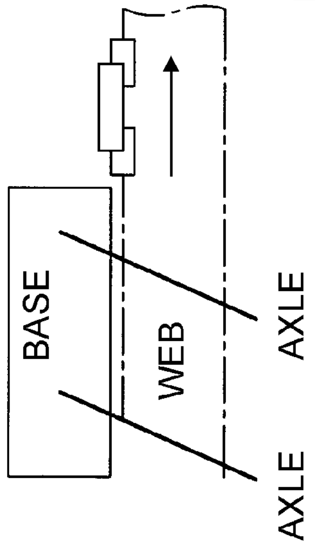
Figure 38E:
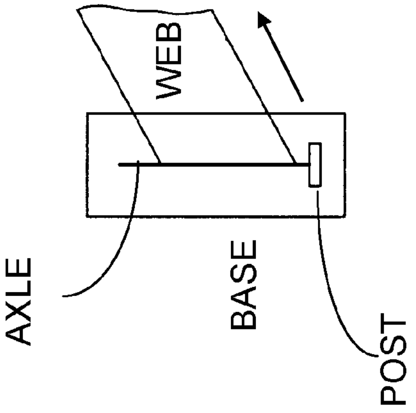
Figure 38F:
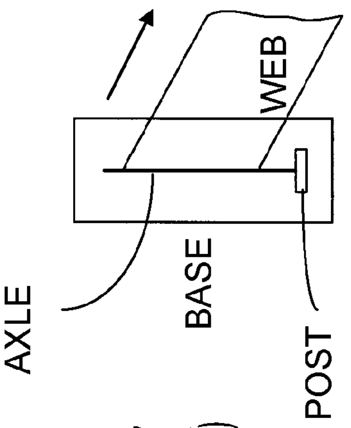
Figure 38L:
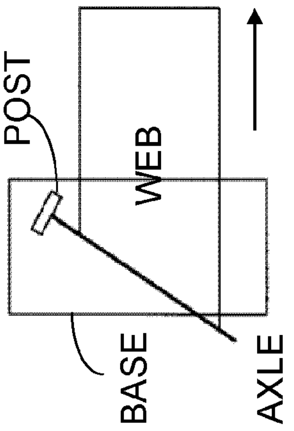
Figure 38K:
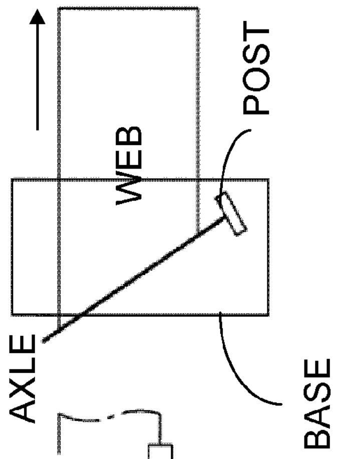
Figure 38J:
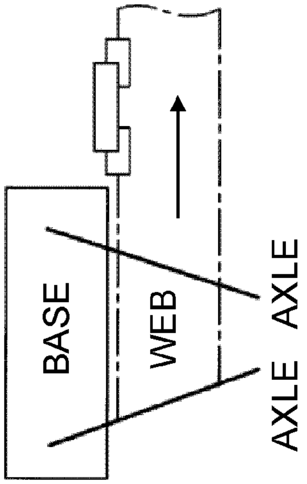
Figure 38I:
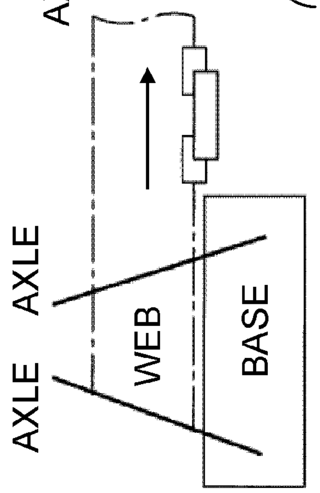
Figure 38H:
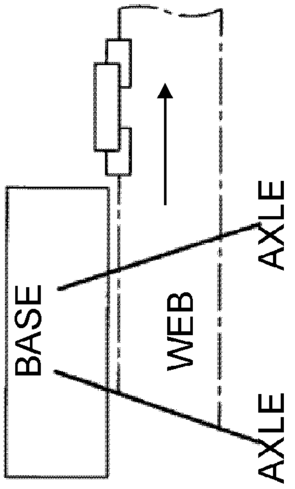
Figure 38G:
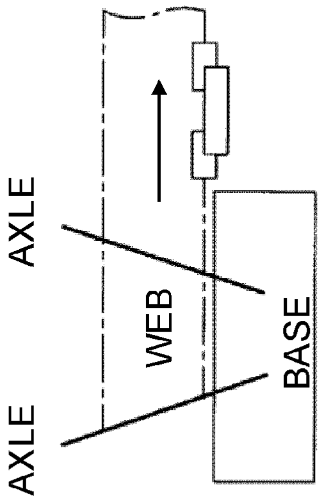

FIG. 37 is an isometric view showing deployment and expansion of web material using the fourth embodiment of the dual axle Apparatus of the Present Invention. Here, both axles are parallel to each other, and are not perpendicular to the direction of deployment. Furthermore, the motorized guide wheel assembly of FIG. 17 deploys both webbing sheets together. An idler assembly is not necessary.

The advantages of using double rolls of web material were discussed previously. Two single rolls of web material deployed together can exhibit the same benefits. The key is to prevent the cell structure of the two sheets from being coincident. As mentioned previously, the angles of the tilde rows may be different on each sheet. However, the same effect can be exhibited if the cell structure of one sheet is not congruent to that of the other. Here, the tilde-slit patterns would be of different sizes. Even if the tilde patterns are congruent and oriented in the same direction, the same effect may be exhibited if the rolls are offset from on another. Similarly, two congruent sheets can be used where one sheet is the reverse of the other. The use of two sheets in this manner allows the cell structure of one sheet to interlock with the cell structure of the second sheet. When such a dual structure is crumpled together, the resulting three-dimensional structure is both very strong with a high spring-like resilience. It forms a superior packaging material.

FIG. 38 shows a series of twelve schematic diagrams illustrating the various embodiments of the dual axle Apparatus of the Present Invention. They are all shown as top plan views. However, realism is not intended. Instead, the base of the Apparatus is represented as a rectangle. The axles are represented as lines. The intention of FIG. 38 is to show to orientation of the two axles relative to the direction of deployment.

FIG. 38(*a*) illustrates the third embodiment shown in FIG. 36. The web material may or may not have rails. It can be in any of the configurations shown in FIGS. 2-5. Here, the front axle is perpendicular to the direction of deployment, while the real axle is not perpendicular. The arrow represents the direction of deployment. The guide wheel assembly is shown in contact with the web material. FIG. 38(*b*) is the mirror image of the apparatus shown in FIG. 38(*a*). It also represents the third embodiment of the dual axle Apparatus of the Present Invention. However, for this orientation, the tilde patterns of the web rolls must also be the mirror images of those used with the apparatus of FIG. 38(*a*).

FIG. 38(*c*) illustrates the fourth embodiment shown in FIG. 37. Here, the two axles are parallel to each other and not perpendicular to the direction of deployment of the web material. The rear axle is typically lower than the front axle to accommodate both rolls. The clearance created between the rolls allows deployment without tangling of the expanded web material. However, the two web sheets tangle with each other forward of the guide wheel assembly. Just as with the third embodiment, a mirror image device can be manufactured. This is shown in FIG. 38(*d*). Similarly, for this orientation, the tilde patterns of the web rolls must also be the mirror images of those used with the apparatus of FIG. 38(*c*). In this embodiment, there can be no rails on the web material parallel to the longitudinal direction.

FIG. 38(*e*) illustrates a single axle embodiment for manual deployment of the web material. FIG. 38(*f*) is its mirror image. The web material has no rails. Here, the web material must be deployed at an angle not perpendicular to the axle; otherwise, there will be no expansion.

FIG. 38(*g*) and FIG. 38(*h*) represent two dual axle embodiments where the angles of the axles diverge (i.e., form an obtuse angle). FIG. 38(*i*) and FIG. 38(*j*) represent two dual axle embodiments where the angles of the axles converge (i.e., for an acute angle).

Finally, FIG. 38(*k*) and FIG. 38(*l*) illustrate single axle manual deployment systems where the web material is deployed perpendicular to the base, but where the axles are mounted in a direction not perpendicular to the direction of deployment.

It should be apparent to persons having ordinary skill in the art, after reading this disclosure, that additional variations may be created that have not been shown in this disclosure.

We claim:

1. A dispenser to deploy and expand unexpanded web material from a spiral wound roll of said web material, wherein:

the unexpanded web material is flexible;

the unexpanded web material is substantially longer than it is wide;

the unexpanded web material is die cut so that it produces a three-dimensional lattice when expanded;

the unexpanded web material unwinds from the roll in a deployment direction;

the roll comprises a hollow cylindrical core around which the unexpanded web material is wound, said core having two opposite ends each at a transverse edge of the unexpanded web material; and the roll further comprises two annular shaped core plugs that are inserted at the two opposite ends of the hollow cylindrical core;

said dispenser comprising:

a) a base;

b) a first support column affixed to and perpendicular to the base;

c) a first axle for mounting the roll of unexpanded web material, wherein the first axle comprises a first and a second end;

the first end of the first axle is affixed to the first support column at a first vertical height from the base, wherein the first axle extends from the first support column at an angle that is not perpendicular to the deployment direction;

d) a guide wheel assembly through which the unexpanded web material is threaded, wherein the guide wheel assembly is affixed to the base, and wherein the guide wheel assembly further comprises at least three guide wheels that contact and hold the unexpanded web material in at least three places; and e) a braking assembly to retard unraveling of the unexpanded web material from the roll, wherein the braking assembly further comprises:

i) a first component mounted to the first support column and designed to contact with the core plug inserted in a first end of the mounted cylindrical core of the roll of unexpanded web material, said first component additionally comprising a plurality of elements, the combination of which are elastic and which serve to retard motion of the mounted roll of unexpanded web material at the first end of the mounted cylindrical core; and ii) a second component mounted to the first axle, said second component additionally comprising a plurality of elements, wherein at least one of said plurality of elements of said second component is in contact with the core plug inserted in a second end of the mounted cylindrical core opposite said first end, and is adjustable to apply braking pressure to said core plug inserted in the second end of the mounted cylindrical core;

wherein the adjustable force applied to the core plugs at opposite ends of the mounted cylindrical core serves to retard motion of the roll as the web material unravels; and whereby, as the unexpanded web material is pulled through the guide wheel assembly in the deployment direction by applying a diagonally transverse force, the unexpanded web material expands in both the longitudinal and transverse directions.

2. The dispenser of claim 1 wherein the number of guide wheels comprised in the guide wheel assembly is three.

3. The dispenser of claim 2 wherein all three guide wheels have a toroidal shape.

4. The dispenser of claim 2 wherein two of the three guide wheels are identical in size, and the third guide wheel is larger than the other two guide wheels.

5. The dispenser of claim 4 wherein:

the plane of rotation of the larger guide wheel is different from the plane of rotation of the two smaller guide wheels;

both smaller guide wheels rotate in the same plane; and the planes of rotation of the larger guide wheel and the smaller guide wheels are both parallel to each other and to the deployment direction.

6. The dispenser of claim 1 wherein the guide wheel assembly contacts and holds the unexpanded web material at a position closer to the second end of the first axle than the first end of the first axle.

7. The dispenser of claim 1 further comprising a motor connected to the guide wheel assembly to rotate the guide wheels, thereby causing the unexpanded web material to be deployed in the deployment direction and expanded without being pulled manually.

8. The dispenser of claim 1 wherein the plurality of elements of the first component of the braking assembly comprises:

a) a rigid backup plate;

b) an elastic plate, the resilience of which increases as more pressure is applied; and c) a break pad or wear plate, which makes contact with the web core plug at the first end of the mounted cylindrical core.

9. The dispenser of claim 8 wherein the rigid backup plate is fabricated from metal.

10. The dispenser of claim 8 wherein the elastic plate is fabricated from rubber.

11. The dispenser of claim 8 wherein the break pad or wear plate is fabricated from plastic.

12. The dispenser of claim 1 wherein the plurality of elements of the second component of the braking assembly comprises:

a) a cylinder;

b) a mounting pin extending perpendicular to the cylindrical edge of the cylinder to enable mounting of the second component of the braking assembly in a hole on the first axle;

c) at least one hole having machine screw threading; and d) at least one bolt screwed into the at least one threaded hole wherein the end of the at least one bolt makes contact with the core plug inserted into the second end of the mounted cylindrical core and applies a desired force to said core plug.

13. The dispenser of claim 12 wherein the cylinder of the second component of the braking assembly comprises two threaded holes into which two bolts are screwed.

14. The dispenser of claim 13 wherein the bolts further comprise mechanical devices at one end of each bolt to facilitate screwing the bolts into the threaded holes in order to achieve a desired force on the core plug.

15. The dispenser of claim 1 further comprising a plurality of axles for mounting rolls of unexpanded web material mounted to the first support column, and a plurality of brake assemblies of number equal to the number of the plurality of axles, wherein each brake assembly comprises the first component which is secured to the first support column and the second component which is secured to the respective axle.

16. The dispenser of claim 15 wherein the number of the plurality of axles is 2 or 3.

17. The dispenser of claim 1 further comprising:

a) a second support column affixed to and perpendicular to the base; and b) a second axle for mounting the roll of unexpanded web material, wherein the second axle comprises a first and a second end;

the first end of the second axle is affixed to the second support column at a second vertical height from the base, wherein the first vertical height from the base is different from the second vertical height from the base; and wherein the second support column and second axle comprise a brake assembly identical to that affixed to the first support column and first brake assembly.

18. The dispenser of claim 17 wherein the first axle is parallel to the second axle.

19. The dispenser of claim 17 wherein the first axle is not parallel to the second axle.

20. The dispenser of claim 19 wherein the second axle is perpendicular to the deployment direction.

* * * * *